(12) United States Patent
Yu et al.

(10) Patent No.: US 12,052,464 B2
(45) Date of Patent: *Jul. 30, 2024

(54) METHODS AND APPARATUS FOR MEDIA DATA PROCESSING AND TRANSMITTING AND REFERENCE PICTURE SPECIFYING

(71) Applicant: Zhejiang University, Hangzhou (CN)

(72) Inventors: Lu Yu, Hangzhou (CN); Hualong Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,526

(22) Filed: Jun. 27, 2023

(65) Prior Publication Data

US 2023/0353824 A1 Nov. 2, 2023

Related U.S. Application Data

(63) Continuation of application No. 17/418,703, filed as application No. PCT/CN2019/102025 on Aug. 22, 2019, now Pat. No. 11,716,505.

(30) Foreign Application Priority Data

Aug. 29, 2018 (CN) .......................... 201810992086.9
Dec. 6, 2018 (CN) .......................... 201811487546.9
Dec. 6, 2018 (CN) .......................... 201811488779.0

(51) Int. Cl.
*H04N 21/4402* (2011.01)
*H04N 19/70* (2014.01)
*H04N 21/845* (2011.01)

(52) U.S. Cl.
CPC ..... *H04N 21/440227* (2013.01); *H04N 19/70* (2014.11); *H04N 21/4402* (2013.01); *H04N 21/8456* (2013.01)

(58) Field of Classification Search
CPC ........... H04N 21/440227; H04N 19/70; H04N 21/4402; H04N 21/8456
See application file for complete search history.

(56) References Cited

U.S. PATENT DOCUMENTS

2016/0182927 A1 6/2016 Denoual et al.
2016/0212439 A1* 7/2016 Hannuksela ........... H04N 19/46
(Continued)

FOREIGN PATENT DOCUMENTS

CN 104902279 A 9/2015
CN 107634928 A 1/2018
(Continued)

OTHER PUBLICATIONS

Yu, Hualong et al. "Improved DASH for Cross-Random-Access Prediction Structure in Video 1-32 Coding" 2018 JEEE International Symposium on Circuits and Systems (JSCAS), May 4, 2018, 5 pages.

*Primary Examiner* — Richard T Torrente
(74) *Attorney, Agent, or Firm* — Muncy, Geissler, Olds & Lowe, P.C.

(57) ABSTRACT

Methods to produce media data ensure a method for media data transmitting, and a method for media data processing, and the synchronization and correct processing and transmission of bitstreams on the basis of dependency relation between video layer bitstream and library layer bitstream, and correct bitstream is highly efficiently provided to a decoder. With methods for reference picture request processing and reference picture specifying, a current picture includes a library picture set in which the library picture does not belong to the random access segment to which the current picture belongs and the previously most adjacent random access segment, and correct decoding of the current picture is ensured and repeated downloading of library pictures is avoided, thus ensuring the correct decoding and (Continued)

highly efficient transmission of a bitstream produced by library-based video coding method, and increasing transmission efficiency and storage efficiency.

16 Claims, 15 Drawing Sheets

(56) References Cited

U.S. PATENT DOCUMENTS

| | | | |
|---|---|---|---|
| 2018/0007395 A1* | 1/2018 | Ugur | H04N 21/47202 |
| 2018/0227626 A1* | 8/2018 | Nakazawa | H04N 21/433 |
| 2020/0351572 A1* | 11/2020 | Wang | H04N 19/597 |

FOREIGN PATENT DOCUMENTS

| | | |
|---|---|---|
| CN | 107634930 A | 1/2018 |
| CN | 108243339 A | 7/2018 |

* cited by examiner

METHODS AND APPARATUS FOR MEDIA DATA PROCESSING AND TRANSMITTING AND REFERENCE PICTURE SPECIFYING

CROSS REFERENCE TO RELATED APPLICATIONS

This application is a Continuation of co-pending application Ser. No. 17/418,703, filed on Jun. 25, 2021, which is the U.S. National Stage of International Application No. PCT/CN2019/102025 filed on Aug. 22, 2019, which claims priority of Application No. 201810992086.9 filed in China on Aug. 29, 2018, Application No. 201811488779.0 filed in China on Dec. 6, 2018, and Application No. 201811487546.9 filed in China on Dec. 6, 2018, under 35 U.S.C. § 119, the entire contents of all of which are hereby incorporated by reference.

FIELD OF THE INVENTION

The present invention relates to the field of picture or video compression and system transmission. More specifically, the present invention relates to methods and apparatus for media data processing and methods and apparatus for media data transmitting.

BACKGROUND

1. File Format

File format is a special format based on which encoded data is stored in the computer files. It separates metadata and media data, which solves the problems of random access and network streaming.

Media data includes video data, audio data, timed metadata and non-timed picture data, etc. Media data can be divided into multiple access unit, each of which contains one non-timed picture or one or multiple random access segments. When media data is timed, its access units are carried in samples. When media data is non-timed, its access units are carried in metadata items. Metadata is auxiliary data used to describe media data, such as sample entry, track box and so on. There are two types of metadata: timed metadata and non-timed metadata. The timed metadata is stored in media data box together with the media data, while the non-timed metadata in the metadata box. The metadata box is used in different layers in the file.

File format defines structure of the stored media data. A file conforming to the file format contains media data box and several metadata boxes.

Movie Box is an important metadata box, because it contains different types of tracks and several other metadata boxes. The structure of track is logical and timed. In the aspect of logical structure, track includes media track and hint track. In the aspect of timed structure, different tracks share the same timeline of the media data stream.

Track contains multiple types of metadata boxes describing information of media data. For example, the location of media data can be signaled by sample offset, sample size and sample entry boxes. Sample groups are used to gather samples sharing the same properties in the same track. Sample auxiliary information sizes box and sample auxiliary information offsets box are used to signal auxiliary information for samples, wherein the auxiliary type, indicated by aux_info_type, defines the type of the auxiliary information.

Despite the metadata boxes describing media data, there are plenty of boxes describing the properties of the track in the track box. In conventional standards, the dependency relation between different tracks is signaled in Track Reference ('tref') Box. The 'tref' box in a track records the identifier and reference type of a referenced track that is depended on by the current track. There are multiple values of reference type, such as 'hint', 'cdsc', 'font', 'hind', 'vdep', 'dplx', 'subt', 'thmb', 'auxl'. The different values define the type of dependency relation between the current track and the referenced track. For example, 'cdsc' indicates that the current track describes information of the referenced track, 'hint' indicates that the current track is a hint track and redirects to the referenced track containing media data. However, the dependency relation between the samples from the current tracks and the referenced track is implicitly indicated by the presentation time of the samples. That means the current track and the referenced track must share the same timeline and the dependency relation relies on the temporal order. When given dependency relation between samples from tracks with different timeline, the conventional track reference type can neither correctly signal the dependency relation, nor realize the multiplex of non-timed data and the operation flexibility.

2. Media Transport Solution

There are multiple methods for media transport, among which a standardized method is MPEG Media Transport (MMT). MMT is designed by the MPEG system group, targeting at transmit and deliver media content.

The main function of the media transport method is to package media files and deliver the packages to receiver. Package, defined in MMT, is a logical instance, which is composed of one Composition Information (CI) and one or more Asset. The MMT Asset is a logical instance containing the encoded media data which can be timed data or non-timed data. The timed data is usually visual or audial media data, which is restricted to be decoded and present synchronously according to the given presentation time. The non-timed data can be decoded and present at any time that is selected by the consumer service or interaction. The CI records the relation between Assets to realize the synchronized transmission between multiple Assets. Based on the ISO Base Media File Format (ISOBMFF), MMT exploits MPU (Media Processing Unit) to encapsulate files. MPU contains independent and self-contained media data that conforms the MMT instances. It is uniquely identified in MMT Package by means of assigning sequence number and the index of its associated MMT Asset. In such a way, different MPU can be identified. To realize flexible transmission in different network environments, MMT designs hint track in MPU to indicate that the MPU can be fragmented into smaller MFU (Media Fragment Unit). Hint track contains hint sample, which is similar as media sample, as the head information of MFU, which typically records the scalable layer that the MFU belongs to.

The conventional MMT is designed for the media data generated by the conventional video coding methods.

3. Conventional Video Coding Methods

In conventional video coding, video sequence is divided into multiple Random Access Segment (RAS) which supports random access functionality from the segment. As shown in the FIG. 1, a video sequence contains one or multiple RASs, each of which covers one presentation duration and contains one Random Access Point (RAP) picture and several non-RAP pictures. Every picture has its own presentation time that indicates the time when the picture should be present or displayed. Picture in a RAS can be intra coded or inter coded by referencing to other pictures in the same RAS, where the reference picture can be present pictures or non-present synthesized picture, and so on.

However, in the conventional methods, a picture, whose presentation time follows that of the RAP picture, is restricted to only reference to the other pictures belonging to the same RAS as the current picture does. As for the pictures ahead of or after the RAS corresponding to the current picture, they cannot be referenced to by the current picture, as shown in the FIG. 1. Typically, there are several methods to describe the dependency relation between the current picture and its reference picture candidates:

In the conventional video coding schemes, such as H.264\AVC and H.265\HEVC, the dependency relation between current picture and its reference picture candidates are signaled by reference picture configuration set in the video coding layer, wherein the reference picture configuration set records the difference numbers between the number of current picture and those of its reference pictures. The reason of only recording the difference numbers in the reference picture configuration set is that, in the conventional video coding methods, the current picture and its reference picture candidates belong to the same RAS that can be decoded independently, and the numbers of the current picture and its reference picture candidates conform to the same numeration principle, e.g. numbered in temporal order. Thus, the difference number is enough to correctly identify the target reference picture candidate. If the current picture and its reference picture use different numeration principles, the same difference number would point to a different reference picture candidate from the one when they use the same numeration principles, because the conventional video coding methods do not provide means to signal the different numeration principles. When this happens, the encoder and decoder cannot find the correct reference picture candidate.

In Scalable Video Coding (SVC) and Multiview Video Coding (MVC), as shown in FIG. 2, SVC/MVC introduce inter-layer/inter-view prediction, based on the inter prediction which only use reference picture candidate belonging to the same layer/view, to extend the range of the reference picture candidates. The extended reference picture candidates have the same number, e.g. the same timestamp, and belongs to different layers of an independently decodable segment. SVC/MVC indicate the dependency relation between different layers/views via layer flag together with the number that is same as the current coded picture.

In the scene picture based video coding in AVS2, as shown in FIG. 3, the dependency relation between coded picture and the scene picture is signaled by the flag of the type of the reference picture. Typically, AVS2 exploits flag to signal the special types of scene pictures, i.e. Gpicture and GB picture. The G/GB pictures are managed inside a special reference picture buffer, i.e. scene picture buffer. A flag is introduced to signal whether the current picture references to a G/GB picture. A special reference picture set construction method is designed, i.e. the G/GB picture is always put in the last position of the reference picture set. As a consequence, the above mechanism makes it possible for the current coded picture, which is numbered in numeration principle, to find the 1) GB picture, which is not numbered in numeration principle, or 2) G picture, which is beyond the restricted reference range of the current picture although is numbered in numeration principle, and use the G/GB picture as reference. However, the above method restricts that only one scene picture exists in the scene picture buffer at any time, and, meanwhile, the single scene picture must be inside the same RAS that containing the current picture.

4. Library-Based Video Coding

The mentioned mechanism of conventional methods would limit the number of reference pictures that can be used by the current coding picture, which could not efficiently improve the coding gain of picture encoding and decoding.

In order to make full use of the mutual information between multiple RASs in picture encoding, the encoder/decoder can select picture, from library, which has the similar texture content with the current encoding/decoding picture as reference picture when encoding/decoding the current picture. The special reference picture from library is referred to as library picture and the dataset storing the library picture as library. The method of allowing that one or multiple pictures in a video sequence uses one or multiple library pictures as reference picture for encoding/decoding is named as library-based video coding. Encoding a video sequence with the library-based video coding method generates a library layer bitstream containing the coded library picture and a video layer bitstream containing the coded video sequence picture. The mentioned two kinds of bitstreams is similar as the base layer bitstream and the enhancement layer bitstream in SVC (Scalable Video Coding), i.e. the video layer bitstream depends on the library layer bitstream. However, the management of the two bitstream generated by the library-based video coding method is different from the layered bitstream generated by SVC. The difference is that the layered bitstreams in SVC are synchronized based on a same timeline, while the two bitstreams in library-based video coding are not synchronized based on the same timeline but are synchronized based on explicitly signaling.

The library-based video coding method brings problems for the storage, transmission and reference picture managements of its bitstream.

In the library-based video coding, library picture is obtained and exploited as extra reference picture candidate for the picture encoding/decoding. FIG. 4 depicts the dependency relation between sequence picture and library picture while in using the library-based video coding method. Library picture makes it possible for the sequence picture to exploit the mutual information from a large-scale range of temporal domain, which improves the coding efficiency. However, the conventional library-based video coding method could no efficiently support the signaling of dependency relation between the sequence pictures and library pictures as well as the efficient management of library picture.

The scalable layer description in mentioned MMT can signal the layered information of SVC coded bitstream, wherein the dependency relation between coded picture in the same time instant but from different layers can be realized by the cooperation of the temporal information and the scalable layer description. However, the above method could not signal the non-timed dependency relation between coded pictures in video layer bitstream and library layer bitstream.

DETAILED DESCRIPTION OF THE PRESENT INVENTION

Based on the shortcomings of the conventional methods, this invention targets at providing methods and apparatus to produce media data, media data transmitting, media data processing, reference picture request processing and reference picture specifying, in order to realize correctly decoding and efficient transmitting of the bitstream coded by library-based video coding method, and improve the efficiency of transmission and storage.

To achieve the above purpose, this invention exploits the following technological solutions:

The first aspect of the present invention is to provide a method of specifying reference picture that includes:

Decoder extracts a first signaling flag from a reference mapping table, wherein the first signaling flag is used to indicate whether the numeration method of reference picture identifier follows two or more kinds of numeration principles, and wherein the reference picture identifier corresponds to a reference index in the reference mapping table and the numeration method appoints a reference picture identifier to a reference picture;

When the numeration method of reference picture identifier follows two or more kinds of numeration principles, decoder extracts one or multiple second signaling flags from the reference mapping table, wherein the corresponding reference index of any one of those second signaling flags is denoted as j and the said one second signaling flag indicates the numeration principle followed by the numeration method of the reference picture identifier corresponding to the reference index j;

Decoder extracts the reference picture identifier corresponding to the reference index j from the reference mapping table;

When the numeration principle for the reference picture identifier is the first numeration principle, decoder adopts the same numeration principle with the current picture identifier's numeration principle to specify the reference picture of current picture with the reference picture identifier;

When the numeration principle for the reference picture identifier is the second numeration principle, decoder obtains the reference picture information returned from outside of decoder using the reference picture identifier, wherein the reference picture information is used to specify the reference picture of current picture.

The present method further comprises:

Decoder extracts one or multiple reference picture identifiers and the second signaling flag, wherein the corresponding reference index of any one of those reference picture identifiers and second signaling flags is denoted as j, from an updated reference mapping table;

When the reference index j in the updated reference mapping table also exists in the reference mapping table, replace the reference picture identifier and the second signaling flag corresponding to the reference index j in the reference mapping table with the reference picture identifier and the second signaling flag corresponding to the reference index j in the updated reference mapping table;

When the reference index j in the updated reference mapping table does not exist in the reference mapping table, add the reference index j and the corresponding reference picture identifier as well as the second signaling flag from the updated reference mapping table to the reference mapping table.

The present method further comprises:

When decoder decodes current picture using a reference picture, wherein the reference picture is obtained from a reference picture identifier using the second numeration principle, decoder sets the distance between the reference picture and current picture as non-temporal distance.

The second aspect of the present invention is to provide a method of processing request of reference picture, the method comprising:

Obtain dependency map table of at least one first segment to obtain the map relation between the reference picture identifier of at least one reference picture depended on by the said first segment and the location information of the second segment containing the said reference picture;

Obtain the reference picture identifier of at least one reference picture depended on by a current picture by receiving request of reference picture sent by a decoder, wherein the current picture belongs to the said first segment;

Obtain location information of at least one second segment, which contains reference picture indicated by the reference picture identifier of the reference picture recorded in the request information, from the dependency map table of the first segment containing the current picture;

Send information of the reference picture contained by the second segment, which is located by the location information of the second segment, to the decoder.

The present method further comprises:

Obtain dependency map table of at least one first segment from media presentation description.

The present method, in which the operation of sending information of the reference picture contained by the second segment, which is located by the location information of the second segment, to the decoder, further comprises:

Search in buffer the reference picture contained by the second segment or the segment itself which is located by the location information of the second segment;

If the reference picture contained by the second segment or the segment itself exists in the buffer, obtain the reference picture from buffer;

If the reference picture contained by the second segment or the segment itself does not exist in the buffer, download the second segment from server.

The third aspect of the present invention is to provide an apparatus of specifying reference picture that includes:

Processor;

Memory;

One or more programs to accomplish the following methods:

Processor extracts a first signaling flag from a reference mapping table, wherein the first signaling flag is used to indicate whether the numeration method of reference picture identifier follows two or more kinds of numeration principles, and wherein the reference picture identifier corresponds to a reference index in the reference mapping table and the numeration method appoints a reference picture identifier to a reference picture;

When the numeration method of a reference picture identifier follows two or more kinds of numeration principles, processor extracts one or multiple second signaling flags from the reference mapping table, wherein the corresponding reference index of any one of those second signaling flags is denoted as j and the said one second signaling flag indicates the numeration principle followed by the numeration method of the reference picture identifier corresponding to the reference index j;

Processor extracts the reference picture identifier corresponding to the reference index j from the reference mapping table;

When the numeration principle for the reference picture identifier is the first numeration principle, processor adopts the same numeration principle with the current picture identifier's numeration principle to specify the reference picture of current picture with the reference picture identifier;

When the numeration principle for the reference picture identifier is the second numeration principle, processor obtains the reference picture information returned from outside of decoder using the reference picture identifier, wherein the reference picture information is used to specify the reference picture of current picture.

The reference mapping table and reference picture are restored in the memory.

The present apparatus further comprises:

Processor extracts at least one reference picture identifier and the second signaling flag, wherein the corresponding reference index of any one of those reference picture identifiers and second signaling flags is denoted as j, from an updated reference mapping table;

When the reference index j in the updated reference mapping table also exists in the reference mapping table, processor replaces the reference picture identifier and the second signaling flag corresponding to the reference index j in the reference mapping table with the reference picture identifier and the second signaling flag corresponding to the reference index j in the updated reference mapping table;

When the reference index j in the updated reference mapping table does not exist in the reference mapping table, processor adds the reference index j and the corresponding reference picture identifier as well as the second signaling flag from the updated reference mapping table to the reference mapping table.

The present apparatus further comprises:

When decoder decodes current picture using a reference picture, wherein the reference picture is obtained from a reference picture identifier using the second numeration principle, processor sets the distance between the reference picture and current picture as non-temporal distance.

The fourth aspect of the present invention is to provide an apparatus of processing request of reference picture, comprises:

Processor;
Memory;
Transmitter; And
One or multiple programs used to complete the following methods:

Processor obtains dependency map table of at least one first segment to obtain the map relation between the reference picture identifier of at least one reference picture depended on by the said first segment and the location information of the second segment containing the said reference picture;

Processor obtains the reference picture identifier of at least one reference picture depended on by a current picture by receiving request of reference picture sent by a decoder, wherein the current picture belongs to the said first segment;

Processor obtains location of at least one second segment, which contains reference picture indicated by the reference picture identifier of the reference picture recorded in the request information, from the dependency map table of the first segment containing the current picture;

Transmitter sends information of the reference picture contained by the second segment, which is located by the location information of the second segment, to the decoder.

The dependency map table and reference picture processed by the processor exist in the memory.

The present apparatus further comprises:

Processer obtains dependency map table of at least one first segment from media presentation description.

The present apparatus further comprising:

Processor searches in buffer the reference picture contained by the second segment or the segment itself which is located by the location information of the second segment;

If the reference picture contained by the second segment or the segment itself exists in the buffer, processor obtains the reference picture from buffer;

If the reference picture contained by the second segment or the segment itself does not exist in the buffer, processer downloads the second segment from server.

The fifth aspect of the present invention is to provide an apparatus of specifying reference picture that includes:

The first extraction unit: used to extract a first signaling flag in a reference mapping table, which is used to indicate whether the numeration method of a reference picture identifier that corresponds to a reference index in the reference mapping table uses mixed numeration principles;

The second extraction unit: When the numeration method of a reference picture identifier that corresponds to the reference index in reference mapping table adopts mixed numeration principles, the said unit is used to extract the at least one second signaling flag j in the reference mapping table, wherein the corresponding reference index of any one of those second signaling flag is denoted as j, and wherein the second signaling flag is used to extract a numeration principle of the reference picture identifier corresponding to the reference index j;

The third extraction unit: used to extract the reference picture identifier corresponding to the reference index j from the reference mapping table;

The first specification unit: When the numeration principle for the reference picture identifier is the first numeration principle, the said unit is used to adopt the same numeration principle with the current picture identifier's numeration principle and specify the reference picture of current picture with the reference picture identifier;

The second specification unit: When the numeration principle for the reference picture identifier is the second numeration principle, the said unit is used to obtain the reference picture information returned from outside of decoder using the reference picture identifier and specify the reference picture of current picture.

The present apparatus further comprises:

The fourth extraction unit: used to extract an updated reference mapping table and obtain at least one reference picture identifier and the second signaling flag, wherein the corresponding reference index of any one of those reference picture identifiers and second signaling flags is denoted as j, from the updated reference mapping table;

The replacing unit: when the reference index j in the updated reference mapping table exists in the reference mapping table, it is used to replace the reference picture identifier and the second signaling flag corresponding to the reference index j in the reference mapping table with the reference picture identifier and the second signaling flag corresponding to the reference index j in the updated reference mapping table;

The addition unit: when the reference index j in the updated reference mapping table does not exist in the reference mapping table, it is used to add the reference index j and the corresponding reference picture identifier as well as the second signaling flag from the updated reference mapping table to the reference mapping table.

The present apparatus further comprises:

The setting unit: when decoder decodes current picture using a reference picture, wherein the reference picture is obtained from a reference picture identifier using the second numeration principle, the said unit sets the distance between the reference picture and current picture as non-temporal distance.

The sixth aspect of the present invention is to provide an apparatus of processing request of reference picture, comprises:

The first obtain unit: used to obtain dependency map table of at least one first segment to obtain the map relation between the reference picture identifier of at least one reference picture depended on by the said first segment and the location information of the second segment containing the said reference picture;

Receive unit: used to obtain the reference picture identifier of at least one reference picture depended on by a current picture by receiving request of reference picture sent by a decoder, wherein the current picture belongs to the said first segment;

The second obtain unit: used to obtain location information of at least one second segment, which contains reference picture indicated by the reference picture identifier of the reference picture recorded in the request information, from the dependency map table of the first segment containing the current picture;

Transmit unit: used to send information of the reference picture contained by the second segment, which is located by the location information of the second segment, to the decoder.

The present apparatus further comprises:

The third obtain unit: used to obtain dependency map table of at least one first segment from media presentation description.

The present transmit unit further comprises:

Search unit: used to search in buffer the reference picture contained by the second segment or the segment itself which is located by the location information of the second segment;

If the reference picture contained by the second segment or the segment itself exists in the buffer, the fourth obtain unit to obtain the reference picture from buffer;

If the reference picture contained by the second segment or the segment itself does not exist in the buffer, download unit to download the second segment from server.

The seventh aspect of the present invention also provides a method to produce media data comprising:

Put sample entry of the first media data in a first media track, wherein the first media data is timed media data, and the sample entry contains metadata pointing to sample of the first media data;

Put access unit entry of the second media data in a second media box, wherein the access unit entry contains metadata pointing to access unit of the second media data, and the second media data is timed or non-timed media data;

Mark two or more temporally-discontinuous samples in the first media data as a sample group, wherein the said samples meet one of the following requirements:

If the second media data is timed media data, the encoding or decoding of the said samples reference to the same group of access units in the second media data, wherein the same group of access units and at least one of the said two or more temporally-discontinuous samples are not temporally aligned;

If the second media data is non-timed media data, the encoding or decoding of the said samples reference to the same group of access units in the second media data.

The method further comprising:

If the second media data is timed media data, put track reference information pointing to the second media data box in the first media track, wherein the track reference information contains an identifier indicating that the same group of access units and at least one of the two temporally-discontinuous samples are not temporally aligned.

The method further comprising:

Put description information of the sample group in the first media track, wherein the description information of the sample group contains an identifier indicating that the encoding or decoding of the two or more temporally-discontinuous samples references to the same group of access units.

The eighth aspect of the present invention also provides a method to produce media data, the method comprising:

Put sample entry of the first media data in a first media track, wherein the first media data is timed media data, and the sample entry contains metadata pointing to sample of the first media data.

Put access unit entry of the second media data in a second media box, wherein the access unit entry contains metadata pointing to access unit of the second media data, and the second media data is timed or non-timed media data.

Put dependency metadata for each sample respectively, wherein the sample is one of two or more temporally-discontinuous samples in the first media data and the said two or more temporally-discontinuous samples meet one of the following requirements:

If the second media data is timed media data, the dependency metadata corresponding to each sample contains index information that points to the same group of access units in the second media data, wherein The index information is any information other than the presentation time information of the sample of the first media data, and wherein the encoding or decoding of the said two or more temporally-discontinuous samples reference to the same group of access units, and wherein the same group of access units and at least one of the said two or more temporally-discontinuous samples are not temporally aligned.

If the second media data is non-timed media data, the dependency metadata corresponding to each sample includes index information that points to the same group of access units in the second media data, wherein the index information is any information other than the presentation time information of the sample of the first media data, and wherein the encoding or decoding of the said two or more temporally-discontinuous samples reference to the same group of access units.

Further, put dependency metadata for each sample respectively, wherein the sample is one of two or more temporally-discontinuous samples in the first media data also comprises:

Put the dependency metadata in a timed metadata;

Put sample entry of the timed metadata in a timed metadata track.

Further, put dependency metadata for each sample respectively, wherein the sample is one of two or more temporally-discontinuous samples in the first media data also comprises:

Put the dependency metadata in segment index data box.

The ninth aspect of the present invention also provides a method of processing media data comprising:

Extract the first media data and the second media data, wherein the first media data is timed media data, and the second media data is timed media data or non-timed media data.

Extract sample group from the track carrying the first media data, wherein the sample group contains two or more temporally-discontinuous samples.

According to the description information in the sample group, locate a group of access units in the second media data for each sample of the two or more temporally-discontinuous samples, wherein the index information of the group of access units is carried in the description information of the sample group, and wherein the second media data meets one of the following requirements:

(1) If the second media data is timed media data, the group of access units located by the two or more temporally-discontinuous samples are in the same group in the second media data, wherein the same group of access units is not aligned with the duration covered by at least one of the said samples of the first media data. Or (2) If the second media data is non-timed media data, the access units located by the two samples of the first media data are the same access unit in the second media data.

the method further comprising:

If the second media data is timed media data, parse the track reference information identifier, pointing to the data box to which the second media data belongs, from the track containing the first media data, in order to obtain the information that the same group of access units and at least one of the two temporally-discontinuous samples are not temporally aligned.

the method further comprising:

From the description information in the sample group from the first media track, parse the identifier to obtain the information of the same group of access units to which the said two or more temporally-discontinuous samples reference while in encoding or decoding.

The tenth aspect of the present invention also provides a method of processing media data, the method comprising:

Extract the first media data and the second media data, where the first media data is timed media data, and the second media data is timed media data or non-timed media data;

Extract two or more temporally-discontinuous samples from the first media data.

Extract the dependency metadata from each sample of the two or more temporally-discontinuous samples.

According to the dependency metadata, locate a group of access units in the second media data for each sample of the two or more temporally-discontinuous samples, wherein the index information of the group of access units is carried by the dependency metadata, and wherein the second media data meets one of the following requirements:

If the second media data is timed media data, the access units in the second media data located by the two or more temporally-discontinuous samples are in the same group, wherein the same group of access units and at least one of the two or more temporally-discontinuous samples in the first media data are not temporally aligned.

If the second media data is non-timed media data, the access units in the second media data located by the two or more temporally-discontinuous samples are the same access unit.

Further, extract dependency metadata from each sample of the said two or more temporally-discontinuous samples comprises:

Extract the timed metadata pointed to by the sample entry in a timed metadata track;

Extract dependency metadata in the timed metadata.

Further, extract dependency metadata from each of the said two or more of temporally-discontinuous samples in the first media data comprises:

Extract the dependency metadata from segment index data box.

The eleventh aspect of the present invention is to provide a method of transmitting media data comprises:

Fragment the first media data into media fragment units (MFUs), wherein the first media data is timed media data and consists of two or more temporally discontinuous samples;

Extract the dependent indexing information corresponding to the MFUs of first media data, wherein the dependent indexing information is the information except the displaying time information of MFUs' sample;

Transmit the extracted MFUs of the first media data;

Using the dependent indexing information corresponding to the MFUs of the first media data, locate the second media data's access unit, wherein the second media data's access unit is referenced by encoding or decoding operation of the first media data sample belonging to the MFUs. Wherein the second media data meets one of the following requirements:

If the second media data is timed media data, the two or more temporally discontinuous samples of the first media data refer to the same second media data's access unit, wherein the time period of the second media data's access unit is not aligned with the time period of at least one sample of two or more temporally discontinuous samples of the first media data;

If the second media data is non-timed media data, the two samples of the first media data refer to the same second media data's access unit, Search the second media data's access unit in hypothetical buffer;

When the hypothetical buffer does not possess the second media data's access unit, fragment the second media data's access unit into media fragment units;

Transmit the media fragment units of the second media data's access data.

The present method further comprises:

Extract dependent indexing information corresponding to the MFU from hint track samples, wherein the hint track samples contain fragment information of the MFU.

The present method further comprises:

Extract dependent indexing information corresponding to the MFU from timed metadata of the MFU.

The twelfth aspect of the present invention also provides an apparatus to produce media data comprising:

Processor;

Memory; And one or more programs are used to complete the following methods:

The processor puts sample entry of the first media data in a first media track, wherein the first media data is timed media data, and the sample entry contains metadata pointing to sample of the first media data.

The processor puts access unit entry of the second media data in a second media box, wherein the access unit entry contains metadata pointing to access unit of the second media data, and the second media data is timed or non-timed media data.

The processor marks two or more temporally-discontinuous samples in the first media data as a sample group, wherein the said samples meet one of the following requirements:

If the second media data is timed media data, the encoding or decoding of the said samples reference to the same group of access units in the second media data, wherein the same group of access units and at least one of the said two or more temporally-discontinuous samples are not temporally aligned;

If the second media data is non-timed media data, the encoding or decoding of the said samples reference to the same group of access units in the second media data.

The media data produced by the above processing by the processor is stored in the memory.

The thirteenth aspect of the present invention also provides an apparatus to produce media data, the apparatus comprising:

Processer;
Memory;
One or more programs are used to complete the following methods:

Processer puts sample entry of the first media data in a first media track, wherein the first media data is timed media data, and the sample entry contains metadata pointing to sample of the first media data.

Processer puts access unit entry of the second media data in a second media box, wherein the access unit entry contains metadata pointing to access unit of the second media data, and the second media data is timed or non-timed media data.

Processer puts dependency metadata for each sample respectively, wherein the sample is one of two or more temporally-discontinuous samples in the first media data and the said two or more temporally-discontinuous samples meet one of the following requirements:

If the second media data is timed media data, the dependency metadata corresponding to each sample contains index information that points to the same group of access units in the second media data, wherein the index information is any information other than the presentation time information of the sample of the first media data, and wherein the encoding or decoding of the said two or more temporally-discontinuous samples reference to the same group of access units, and wherein the same group of access units and at least one of the said two or more temporally-discontinuous samples are not temporally aligned.

If the second media data is non-timed media data, the dependency metadata corresponding to each sample includes index information that points to the same group of access units in the second media data, wherein the index information is any information other than the presentation time information of the sample of the first media data, and wherein the encoding or decoding of the said two or more temporally-discontinuous samples reference to the same group of access units.

The media data produced by the processor exists in the memory.

The fourteenth aspect of the present invention also provides an apparatus of processing media data comprising:

Processor;
Memory; And
one or more programs are used to complete the following methods:

The processor processes the media data storing in the memory;

The processor extracts the first media data and the second media data, wherein the first media data is timed media data, and the second media data is timed media data or non-timed media data.

The processor extracts sample group from the track carrying the first media data, wherein the sample group contains two or more temporally-discontinuous samples.

According to the description information in the sample group, the processor locates a group of access units in the second media data for each sample of the two or more temporally-discontinuous samples, wherein the index information of the group of access units is carried in the description information of the sample group, and wherein the second media data meets one of the following requirements:

(1) If the second media data is timed media data, the group of access units located by the two or more temporally-discontinuous samples are in the same group in the second media data, wherein the same group of access units is not aligned with the duration covered by at least one of the said samples of the first media data. Or (2) If the second media data is non-timed media data, the access units located by the two samples of the first media data are the same access unit in the second media data.

The fifteenth aspect of the present invention also provides an apparatus of processing media data, the apparatus comprising:

Processer;
Memory;
One or more programs are used to complete the following methods:

Processer process the media data in the memory;

Processer extracts the first media data and the second media data, where the first media data is timed media data, and the second media data is timed media data or non-timed media data;

Processer extracts two or more temporally-discontinuous samples from the first media data.

Processer extracts the dependency metadata from each sample of the two or more temporally-discontinuous samples.

According to the dependency metadata, processer locates a group of access units in the second media data for each sample of the two or more temporally-discontinuous samples, wherein the index information of the group of access units is carried by the dependency metadata, and wherein the second media data meets one of the following requirements:

If the second media data is timed media data, the access units in the second media data located by the two or more temporally-discontinuous samples are in the same group, wherein the same group of access units and at least one of the two or more temporally-discontinuous samples in the first media data are not temporally aligned.

If the second media data is non-timed media data, the access units in the second media data located by the two or more temporally-discontinuous samples are the same access unit.

The sixteenth aspect of the present invention is to provide an apparatus of transmitting media data comprises:

Processor;
Memory;
Transmitter; and
One or more programs to accomplish the following methods:

Processor processes the existed media data in memory;

Processor fragments the first media data into media fragment units (MFUs), wherein the first media data is timed media data and consists of two or more temporally discontinuous samples;

Processor extracts the dependent indexing information corresponding to the MFUs of first media data, wherein the dependent indexing information is the information except the displaying time information of MFUs' sample;

Transmitter transmits the extracted MFUs of the first media data;

Processor uses the dependent indexing information corresponding to the MFUs of the first media data, and locate the second media data's access unit, wherein the second media data's access unit is referenced by encoding or decoding operation of the first media data sample belonging to the MFUs. Wherein the second media data meets one of the following requirements:

If the second media data is timed media data, the two or more temporally discontinuous samples of the first media data refer to the same second media data's access unit, wherein the time period of the second media data's access unit is not aligned with the time period of at least one sample of two or more temporally discontinuous samples of the first media data; or If the second media data is non-timed media data, the two samples of the first media data refer to the same second media data's access unit;

Processor searches the second media data's access unit in hypothetical buffer;

When the hypothetical buffer does not possess the second media data's access unit, processor fragments the second media data's access unit into media fragment units;

Transmitter transmits the media fragment units of the second media data's access data.

The seventeenth aspect of the present invention also provides an apparatus to produce media data comprising:

The first insert unit, which is used to put sample entry of the first media data in a first media track, wherein the first media data is timed media data, and the sample entry contains metadata pointing to sample of the first media data.

The second insert unit, which is used to put access unit entry of the second media data in a second media box, wherein the access unit entry contains metadata pointing to access unit of the second media data, and the second media data is timed or non-timed media data.

Mark unit, which is used to mark two or more temporally-discontinuous samples in the first media data as a sample group, wherein the said samples meet one of the following requirements:

If the second media data is timed media data, the encoding or decoding of the said samples reference to the same group of access units in the second media data, wherein the same group of access units and at least one of the said two or more temporally-discontinuous samples are not temporally aligned;

If the second media data is non-timed media data, the encoding or decoding of the said samples reference to the same group of access units in the second media data.

The eighteenth aspect of the present invention also provides an apparatus to produce media data, the apparatus comprising:

The first insert unit, which is used to put sample entry of the first media data in a first media track, wherein the first media data is timed media data, and the sample entry contains metadata pointing to sample of the first media data.

The second insert unit, which is used to put access unit entry of the second media data in a second media box, wherein the access unit entry contains metadata pointing to access unit of the second media data, and the second media data is timed or non-timed media data.

The third insert unit, which is used to put dependency metadata for each sample respectively, wherein the sample is one of two or more temporally-discontinuous samples in the first media data and the said two or more temporally-discontinuous samples meet one of the following requirements:

If the second media data is timed media data, the dependency metadata corresponding to each sample contains index information that points to the same group of access units in the second media data, wherein the index information is any information other than the presentation time information of the sample of the first media data, and wherein the encoding or decoding of the said two or more temporally-discontinuous samples reference to the same group of access units, and wherein the same group of access units and at least one of the said two or more temporally-discontinuous samples are not temporally aligned.

If the second media data is non-timed media data, the dependency metadata corresponding to each sample includes index information that points to the same group of access units in the second media data, wherein the index information is any information other than the presentation time information of the sample of the first media data, and wherein the encoding or decoding of the said two or more temporally-discontinuous samples reference to the same group of access units.

The nineteen aspect of the present invention also provides an apparatus of processing media data comprising:

The first extract unit, which is used to extract the first media data and the second media data, wherein the first media data is timed media data, and the second media data is timed media data or non-timed media data.

The second extract unit, which is used to extract sample group from the track carrying the first media data, wherein the sample group contains two or more temporally-discontinuous samples.

The located unit, which is used to locate a group of access units in the second media data for each sample of the two or more temporally-discontinuous samples according to the description information in the sample group, wherein the index information of the group of access units is carried in the description information of the sample group, and wherein the second media data meets one of the following requirements:

(1) If the second media data is timed media data, the group of access units located by the two or more temporally-discontinuous samples are in the same group in the second media data, wherein the same group of access units is not aligned with the duration covered by at least one of the said samples of the first media data. Or (2) If the second media data is non-timed media data, the access units located by the two samples of the first media data are the same access unit in the second media data.

The twentieth aspect of the present invention also provides an apparatus of processing media data, the apparatus comprising:

The first extract unit, which is used to extract the first media data and the second media data, where the first media data is timed media data, and the second media data is timed media data or non-timed media data;

The second extract unit, which is used to extract two or more temporally-discontinuous samples from the first media data.

The third extract unit, which is used to extract the dependency metadata from each sample of the two or more temporally-discontinuous samples.

The location unit, which is used to locate a group of access units in the second media data for each sample of the two or more temporally-discontinuous samples according to the dependency metadata, wherein the index information of the group of access units is carried by the dependency metadata, and wherein the second media data meets one of the following requirements:

If the second media data is timed media data, the access units in the second media data located by the two or more temporally-discontinuous samples are in the same group, wherein the same group of access units and at least one of the two or more temporally-discontinuous samples in the first media data are not temporally aligned.

If the second media data is non-timed media data, the access units in the second media data located by the two or more temporally-discontinuous samples are the same access unit.

The twenty-first aspect of the present invention is to provide an apparatus of transmitting media data comprises:

The first fragment unit: used to fragment the first media data into media fragment units (MFUs), where the first media data is timed media data and consists of two or more temporally discontinuous samples;

The extraction unit: used to extract the dependent indexing information corresponding to the MFUs of first media data, where the dependent indexing information is the information except the displaying time information of MFUs' sample;

The first transmission unit: used to transmit the extracted MFUs of the first media data The location unit: uses the dependent indexing information corresponding to the MFUs of the first media data, and locate the second media data's access unit, where the second media data's access unit is referenced by encoding or decoding operation of the first media data sample belonging to the MFUs. The second media data meets one of the following requirements:

If the second media data is timed media data, the two or more temporally discontinuous samples of the first media data refer to the same second media data's access unit, and the time period of the second media data's access unit is not aligned with the time period of at least one sample of two or more temporally discontinuous samples of the first media data; or If the second media data is non-timed media data, the two samples of the first media data refer to the same second media data's access unit;

The searching unit: used to search the second media data's access unit in the hypothetical buffer;

The second fragment unit: when the second media data's access unit does not exist in the hypothetical buffer, it is used to fragment the second media data's access unit into media fragment units;

The second transmission unit: used to transmit the media fragment units of the second media data's access unit.

The present invention provides methods and apparatus to produce media data, methods and apparatus for media data transmitting, methods and apparatus for media data processing and methods and apparatus for reference picture specifying. These methods and apparatus form a full set of methods and apparatus from encoder to decoder, which ensures the correct decoding and efficient transmitting of the video layer bitstream and library layer bitstream obtained by the library-based video coding method, and improves the efficiency of transmission and storage.

Firstly, the method to produce media puts the video layer bitstream and library layer bitstream as well as the dependency relation into the media data or the file it belonging to. Secondly, the method of media data transmitting synchronizes the video layer data and the library layer data, to which it references, based on the dependency relation in the media data generated by the library-based video coding. This can avoid repeatedly storing and downloading of the library layer data. Then, the method of media processing extracts the video layer bitstream and the library layer bitstream from the media data coded by library-based video coding method. The method of reference picture request processing obtains reference picture from the extracted library layer bitstream according to the dependency relation as well as the reference picture request from the decoder, and sends the reference picture to the decoder. The method of reference picture specifying enables that the decoder specifies the exact library picture, in the library layer bitstream, for the coding picture to use it as reference, in the video layer bitstream, according to the dependency relation, wherein the library picture does not belong to the current RAS containing the current picture as well as the former one RAS that is nearest to the current RAS.

The above methods solve the problem of the conventional methods having no ability to provide library picture as reference for current coding picture, and ensure correct encoding/decoding by providing correct library picture for coded picture in the video layer bitstream. Meanwhile, the invented methods improve the efficiency of transmission and storage, and ensure the correct decoding of the video layer bitstream at the receiver side.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only In order to clearly explain the embodiments or the conventional methods, drawings of the embodiments or the conventional methods are briefly introduced. Obviously, the following drawings are only for some embodiments of this invention. For those experts in this field, other drawings can be obtained according to the present drawings without any creative work.

DETAILED EMBODIMENTS

To make the purpose, technological solutions and advantages of this invention more clearly, the following content provides detailed description of this invention with assistance of the drawings.

Before explain the embodiments, the terms are first defined as follows:

Library picture: library picture is a picture that does not belong to the current RAS containing the current picture as well as the former one RAS that is nearest to the current RAS. It is a kind of reference picture and can provide reference for current encoding/decoding picture.

Figure 1:
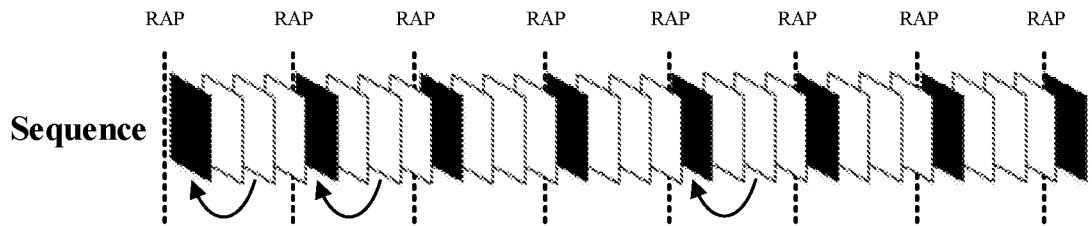
FIG. 1 Example of the dependency relation of the video sequence when coded with the conventional method 1, wherein the sequence is fragmented into multiple RASs.
Figure 2:
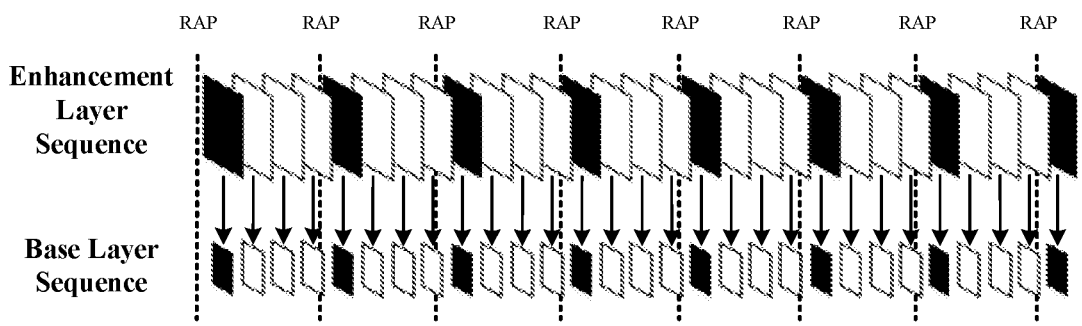
FIG. 2 Example of the dependency relation of the video sequence when coded with the conventional method 2, wherein the sequence is fragmented into multiple RASs.
Figure 3:
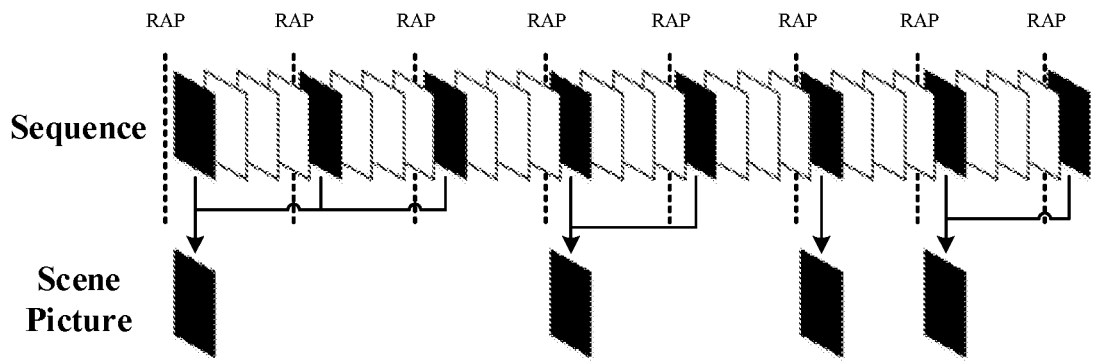
FIG. 3 Example of the dependency relation of the video sequence when coded with the conventional method 3, wherein the sequence is fragmented into multiple RASs.
Figure 4:
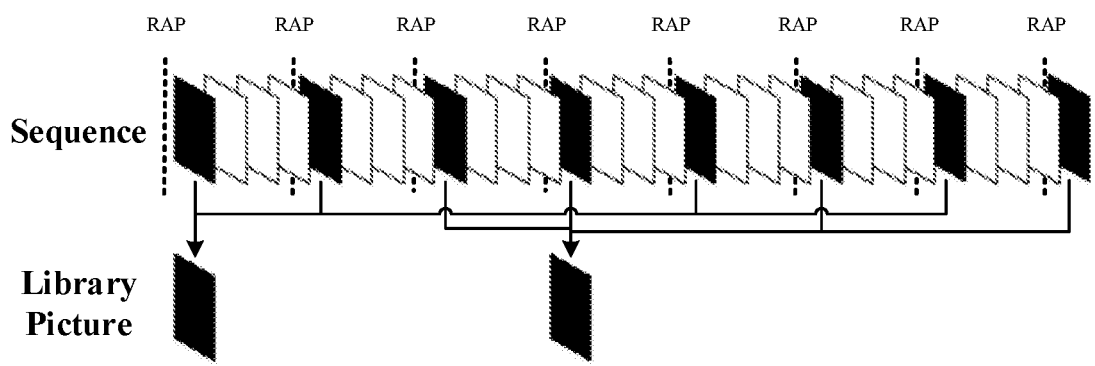
FIG. 4 Example of the dependency relation of the video sequence when coded with the conventional method 4, wherein the sequence is fragmented into multiple RASs.
Figure 5:
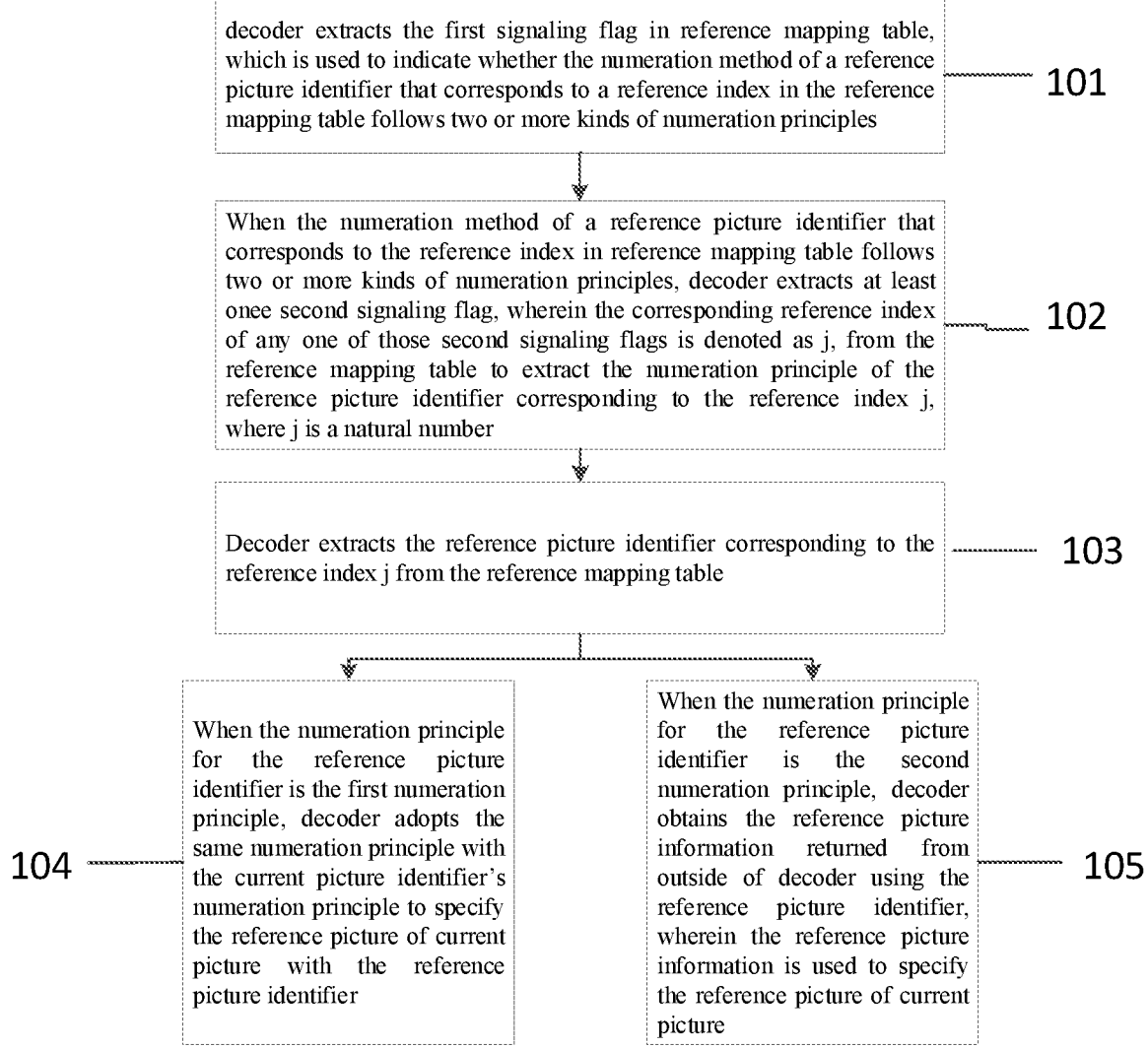
FIG. 5 The flow chart of an embodiment provided by this invention for methods of reference picture specifying.

Exemplary Embodiment 1 provides a method of specifying reference picture, with FIG. 5 depicts a possible example of the flowchart:

Step 101: decoder extracts the first signaling flag in reference mapping table, which is used to indicate whether the numeration method of a reference picture identifier that corresponds to a reference index in the reference mapping table follows two or more kinds of numeration principles;

Step 102: When the numeration method of a reference picture identifier that corresponds to the reference index in reference mapping table follows two or more kinds of numeration principles, decoder extracts at least one second signaling flag, wherein the corresponding reference index of any one of those second signaling flags is denoted as j, from the reference mapping table to extract the numeration principle of the reference picture identifier corresponding to the reference index j, where j is a natural number;

Step 103: Decoder extracts the reference picture identifier corresponding to the reference index j from the reference mapping table;

Step 104: When the numeration principle for the reference picture identifier is the first numeration principle, decoder adopts the same numeration principle with the current picture identifier's numeration principle to specify the reference picture of current picture with the reference picture identifier;

Step 105: When the numeration principle for the reference picture identifier is the second numeration principle, decoder obtains the reference picture information returned from outside of decoder using the reference picture identifier, wherein the reference picture information is used to specify the reference picture of current picture.

Exemplary Embodiment 2 provides a method of specifying reference picture, which is changed from Exemplary Embodiment 1, with the difference of:

In the Video Coding Standard AVS3's syntax table, reference_configuration_set denotes the reference mapping table, reference to library enable flag denotes the first signaling flag, is_library_pid_flag denotes the second signaling flag, library_pid denotes the identifier that adopts the second numeration principle, delta_doi_of_reference_picture denotes the difference between the identifier that adopts the first numeration principle and the current picture identifier. Syntax example is demonstrated in Table 1.

TABLE 1

A syntax example consisting signaling flags and identifier information

| Definition of reference picture set configuration set | Descriptor |
|---|---|
| reference_configuration_set( i ) { | |
|   ( omitting irrelevant syntaxes ) | |
|   reference_to_library_enable_flag[i] | u(1) |
|   num_of_reference_picture[i] | u(3) |
|   for( j=0; j<NumOfReferencePicture[i]; j++ ){ | |
|     if((ReferenceToLibraryEnableFlag[i]==1) | |
| is_library_pid_flag[i][j] | u(1) |
|   if(IsLibraryPidFlag[i][j]==1) | |
| library_pid[i][j] | u(6) |
|     else | |
|       delta_doi_of_reference_picture[i][j] | u(6) |
|   } | |
|   ( omitting irrelevant syntaxes ) | |
| } | |

The semantics of those syntaxes are:

reference_to_library_enable_flag[i]: Binary-state variable. A value of '1' indicates that the current reference picture set configuration set may contain the reference pictures that are library pictures; a value of '0' indicates that no reference picture in the reference picture set configuration set should be library picture. The value of ReferenceToLibraryEnableFlag is equal to the value of reference_to_library_enable_flag. If reference_to_library_enable_flag does not exist in the bitstream, the value of ReferenceToLibraryEnableFlag is equal to 0.

num_of_reference_picture[i]: 3-digit unsigned integer. It indicates the number of reference pictures in the reference picture configuration set. The number of reference pictures should not exceed the size of reference picture buffer. The value of NumOfRefPic[i] is equal to the value of num_of_reference_picture[i]. i is the index of reference picture set.

The bitstream conforming this part should meet the following requirements:

If the PictureType of current picture is 0, the value of num_of_reference_picture[i] should be 0;

If the PictureType of current picture is 1 or 3, the value of num_of_reference_picture[i] should be larger than or equal to 1;

If the PictureType of current picture is 2, the value of num_of_reference_picture[i] should be 2.

is_library_pid_flag[i][j]: Binary-state variable. A value of '1' indicates that the j-th reference picture in the current reference picture set is library picture in library picture buffer, and library reference picture identifierlibrary_pid[i][j] is used to determine the library picture in library picture buffer; a value of '0' indicates that the j-th reference picture in the current reference picture set is not library picture, and delta_doi_of_reference_picture[i][j] is used to determine reference picture in decoded picture buffer. i is the index of reference picture set, j is the number of reference picture. The value of LibraryIndexFlag[i][j] is equal to the value of is_library_pid_flag[i][j]. For a given i-th reference picture set, when the value of IsLibraryPidFlag[i][j] of any j-th reference picture is equal to 1, the value of ReferenceToLibraryOnlyFlag[i] is equal to 1.

library_pid[i][j]: 6-digit unsigned integer, with its value ranging from 0 to 63. It indicates the number of j-th reference picture of current picture's reference picture set in reference picture buffer. i is the index of reference picture set, j is the number of reference picture. The value of LibraryPid[i][j] is equal to the value of library_pid[i][j].

delta_doi_of_reference_picture[i][j]: 6-digit unsigned integer, its value ranging from 1 to 63. It indicates the difference between the decoding order of the j-th reference picture in current picture's reference picture set and current picture. i is the index of reference picture set, j is the number of reference picture. For a same reference picture set configuration set, different reference pictures corresponding to different numbers should have different decoding order difference. The value of DeltaDoiOfRefPic[i][j] is equal to the value of delta_doi_of_reference_picture[i][j].

From Table 1, for the i-th reference_configuration_set, when the value of reference to library enable flag[i] is 1, it indicates identifiers of reference_configuration_set(i) use mixed numeration principles. That is, for the j-th reference index, when the value of is_library_pid_flag[i][j] is 0, the identifier uses the first numeration principle, e.g. delta_doi_of_reference_picture[i][j] representing the relative value of reference picture is fixed-length code with integer number of bits, such as 6-bit fixed-length code; when the value of is_library_pid_flag[i][j] is 1, the identifier uses the second numeration principle, e.g. library_pid[i][j] representing the value of reference picture identifier is fixed-length code with integer number of bits, such as 6-bit fixed-length code.

Exemplary Embodiment 3 provides a method of specifying reference picture, which changes from Exemplary Embodiment 1, with the difference of:

In the Video Coding Standard H.265, the first numeration principle uses delta_poc_s0_minus1 or delta_poc_s1_minus1 to represent the relative value in terms of output order, where the relative value denotes the difference between the referred reference picture and current picture in terms of output order.

Exemplary Embodiment 4 provides a method of specifying reference picture, which changes from Exemplary Embodiment 1, with the difference of:

The first numeration principle is related to displaying order, for example, allocating identifier to picture based on but not limited to the principles such as picture's displaying order, decoding order and output order.

Exemplary Embodiment 5 provides a method of specifying reference picture, which changes from Exemplary Embodiment 1, with the difference of:

The second numeration principle is irrelevant to displaying order, for example, allocating identifier to picture based on but not limited to the principles such as picture's generation order, extraction order, sequential order and random order.

Exemplary Embodiment 6 provides a method of specifying reference picture, which changes from Exemplary Embodiment 1, with the difference of:

Picture set adopting the first numeration principle is the picture set, used for displaying or output, in the video sequence containing the current picture.

Exemplary Embodiment 7 provides a method of specifying reference picture, which changes from Exemplary Embodiment 1, with the difference of:

Picture set adopting the first numeration principle consists of one or multiple types of pictures from intra-coded picture and inter-coded picture.

Exemplary Embodiment 8 provides a method of specifying reference picture, which changes from Exemplary Embodiment 1, with the difference of:

Picture set that uses the second numeration principle is the library picture set.

Exemplary Embodiment 9 provides a method of specifying reference picture, which changes from Exemplary Embodiment 8, with the difference of:

Library picture can be but not constrained to the background picture of video sequence, scene change picture of video sequence, modeled picture from video sequence and synthesized picture of video sequence, where the background picture can be obtained by background modeling of video sequence, and the scene change picture can be obtained by scene change detection of video sequence.

Exemplary Embodiment 10 provides a method of specifying reference picture, which changes from Exemplary Embodiment 8, with the difference of:

Library picture is stored in the second buffer which is different from the first buffer that stores pictures adopting the first numeration principle, for example the second buffer is the library picture buffer.

Exemplary Embodiment 11 provides a method of specifying reference picture, which changes from Exemplary Embodiment 10, with the difference of:

The maximum buffer space is the total space of the first buffer's maximum space and the second buffer's maximum space.

Exemplary Embodiment 12 provides a method of specifying reference picture, which changes from Exemplary Embodiment 1, with the difference of:

Within picture set contained by the bitstream that corresponds to the reference mapping table, numeration method of at least one identifier, wherein the corresponding reference index belongs to the reference mapping table of at least one picture from the said picture set, uses mixed numeration principle, i.e. at least one picture from the said picture set uses at least one library picture as reference picture.

Exemplary Embodiment 13 provides a method of specifying reference picture, which changes from Exemplary Embodiment 1, with the difference of:

Within picture set contained by the bitstream that corresponds to the reference mapping table, numeration method of identifier, wherein the corresponding reference index belongs to the reference mapping table of at least one picture A from the said picture set, uses the first numeration principle, and numeration method of identifier, wherein the corresponding reference index belongs to the reference mapping table of at least one picture B from the said picture set, uses the second numeration principle, i.e. picture B only uses library picture as reference picture.

Exemplary Embodiment 14 provides a method of specifying reference picture, which changes from Exemplary Embodiment 1, with the difference of:

The reference mapping table is contained in the sequence header, picture header or slice header.

Figure 6:
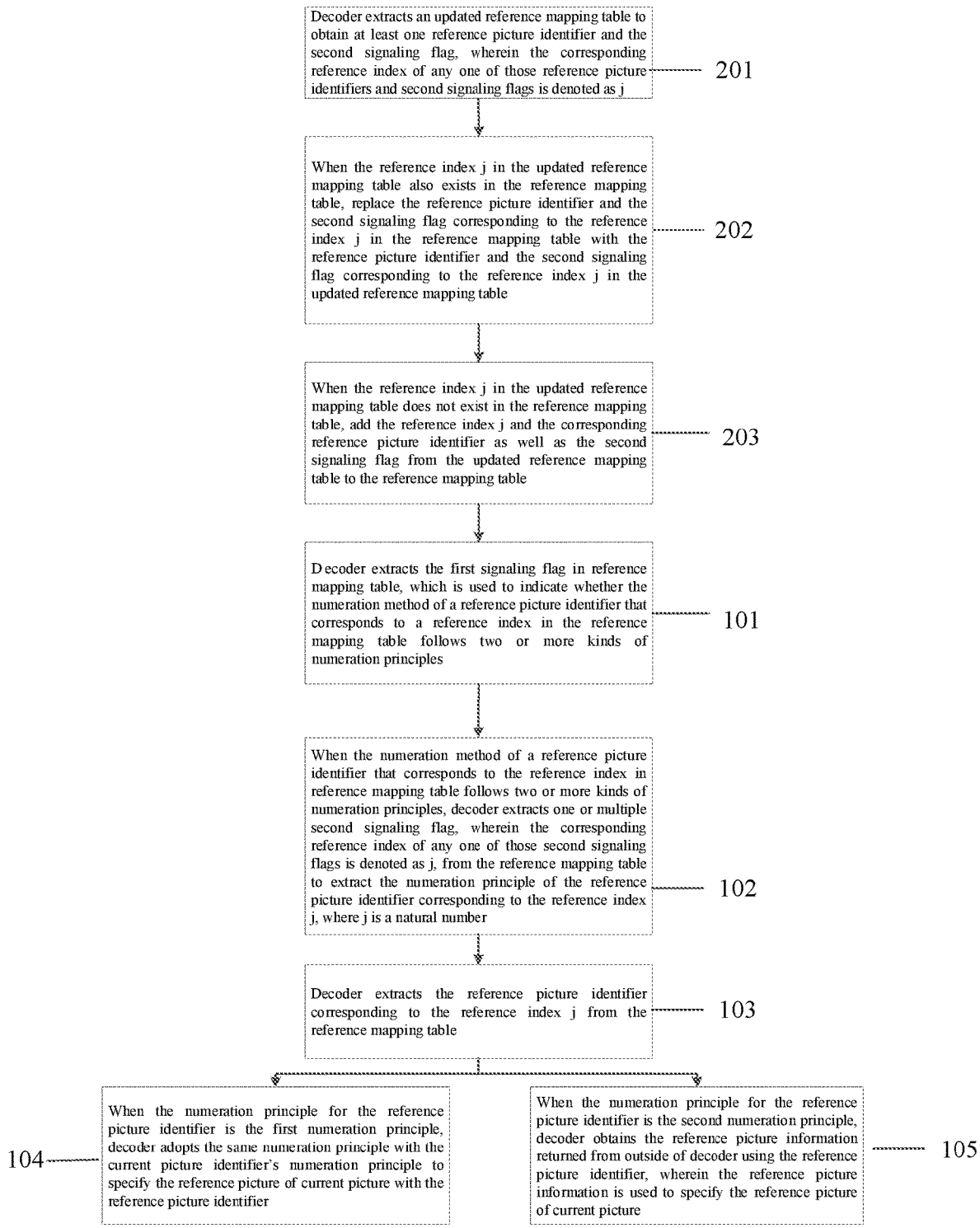
FIG. 6 The flow chart of another embodiment provided by this invention for methods of reference picture specifying.

Exemplary Embodiment 15 provides a method of specifying reference picture, which changes from Exemplary Embodiment 1. FIG. 6 depicts a possible example of the flowchart, different from Exemplary Embodiment 1, the method further comprises update method of reference mapping table, including:

Step 201: Decoder extracts an updated reference mapping table to obtain at least one reference picture identifier and the second signaling flag, wherein the corresponding reference index of any one of those reference picture identifiers and second signaling flags is denoted as j;

Step 202: When the reference index j in the updated reference mapping table also exists in the reference mapping table, replace the reference picture identifier and the second signaling flag corresponding to the reference index j in the reference mapping table with the reference picture identifier and the second signaling flag corresponding to the reference index j in the updated reference mapping table;

Step 203: When the reference index j in the updated reference mapping table does not exist in the reference mapping table, add the reference index j and the corresponding reference picture identifier as well as the second signaling flag from the updated reference mapping table to the reference mapping table.

Exemplary Embodiment 16 provides a method of specifying reference picture, which changes from Exemplary Embodiment 15, with the difference of:

The updated reference mapping table only includes at least one pair of reference index and reference picture identifier that is obtained by the second numeration principle. When updating the reference picture identifier in the reference mapping table which corresponds to at least one reference index referred in the updated reference mapping table, the said reference picture identifier is also marked as using the second numeration principle as its numeration method.

Exemplary Embodiment 17 provides a method of specifying reference picture, which changes from Exemplary Embodiment 15, with the difference of:

The updated reference mapping table is contained in the picture header or slice header.

Exemplary Embodiment 18 provides a method of specifying reference picture, which changes from Exemplary Embodiment 1, with the difference of:

Step 301: When decoder decodes current picture using a reference picture, where the reference picture is obtained from a reference picture identifier using the second numeration principle, decoder sets the distance between the reference picture and current picture as non-temporal distance.

Exemplary Embodiment 19 provides a method of specifying reference picture, which changes from Exemplary Embodiment 18, with the difference of:

Value of the non-temporal distance is a pre-determined non-zero constant value.

Exemplary Embodiment 20 provides a method of specifying reference picture, which changes from Exemplary Embodiment 18, with the difference of:

Value of the non-temporal distance is a non-zero value calculated from the similarity between a reference picture with reference picture identifier adopting the second numeration principle and the current picture.

Exemplary Embodiment 21 provides a method of specifying reference picture, which changes from Exemplary Embodiment 1. Different from Exemplary Embodiment 1, before operating Step 101, the Exemplary Embodiment further comprises:

Step 401: Decoder extracts a third signaling flag to obtain whether the first signaling flag exists in the reference mapping table.

Exemplary Embodiment 22 provides a method of specifying reference picture, which changes from Exemplary Embodiment 2, with the difference of:

In the Video Coding Standard AVS3's sequence header, library_picture_enable_flag denotes the third signaling flag. A syntax example is shown in Table 2 in Italic format. reference_configuration_set denotes the reference mapping table, with a syntax example is shown in Table 3 in Italic format.

TABLE 2

A syntax example consisting the third signaling flag

| Definition of sequence header | Descriptor |
|---|---|
| Sequence_header( ) { | |
|   ( omitting ) | |
|     if ( WeightQuantEnableFlag == 1 ){ | |
|   ( omitting ) | |
| } | |
| *library_picture_enable_flag* | u(*1*) |
| asymmetric_motion_partitions_enable_flag | u(1) |
|   ( omitting ) | |
| } | |

TABLE 3

Another syntax example of reference_configuration_set containing signaling flags and number information

| Definition of reference picture set configuration set | Descriptor |
|---|---|
| reference_configuration_set( i ) { | |
|   ( omitting irrelevant syntaxes ) | u(1) |
| if(LibraryPictureEnableFlag==1) | |
| reference_to_library_enable_flag[i] | u(1) |
| num_of_reference_picture[i] | u(3) |
| for( j=0; j<NumOfReferencePicture[i]; j++ ){ | |
|   if((ReferenceToLibraryEnableFlag[i]==1) | |
|     is_library_pid_flag[i][j] | u(1) |
|   if(IsLibraryPidFlag[i][j]==1) | |
|     library_pid[i][j] | u(6) |
|   else | |
|     delta_doi_of_reference_picture[i][j] | u(6) |
|   ( omitting irrelevant syntaxes ) | |
| } | |

The semantics of those syntaxes are:

library_picture_enable_flag: Binary-state variable. A value of '1' indicates that video sequence could contain library picture and current picture could use picture from library picture buffer as reference picture. A value of '0' indicates that video sequence could not contain library picture and current picture could not use picture from library picture buffer as reference picture. The value of LibraryPictureEnableFlag is equal to the value of library_picture_enable_flag.

From Table 2, when the value of library_picture_enable_flag equals to 1, the value of LibraryPictureEnableFlag equals to 1. reference_to_library_enable_flag[i] exists in reference_configuration_set(i). For the i-th reference_configuration_set, when the value of reference_to_library_enable_flag[i] equals to 1, it indicates picture identifier in reference_configuration_set(i) uses mixed numeration principle. For the j-th reference index, when the value of is_library_pid_flag[i][j] equals to 0, the picture identifier uses the first numeration principle, e.g. delta_doi_of_reference_picture[i][j] denotes the relative value of the reference picture identifiers, wherein delta_doi_of_reference_picture [i][j] is a fixed-length code with integer number of bits such as 6-bit fixed-length code. When the value of is_library_p-id_flag[i][j] equals to 1, picture identifier uses the second numeration principle, e.g. library_pid[i][j] denotes the value of reference picture identifier, wherein library_pid[i][j] is a fixed-length code with integer number of bits such as 6-bit fixed-length code.

Figure 7:
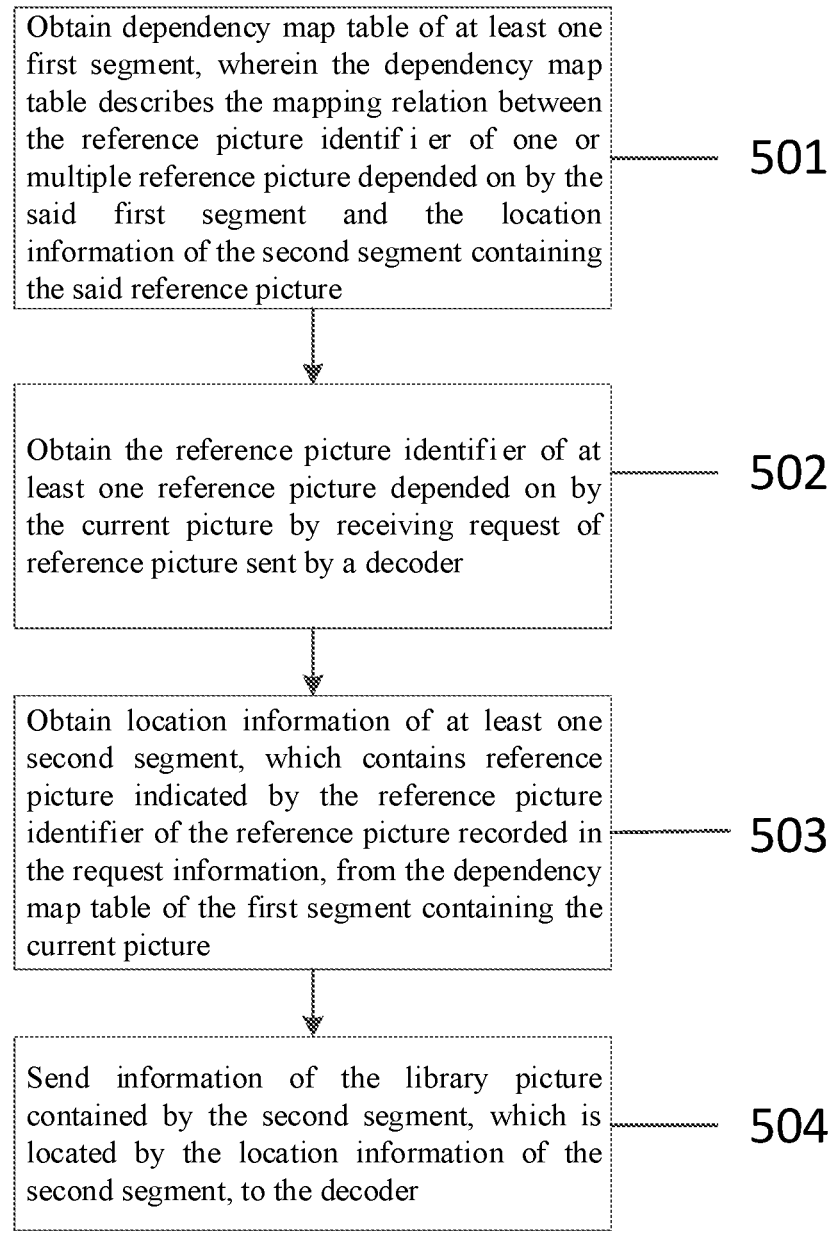
FIG. 7 The flow chart of an embodiment provided by this invention for methods of reference picture request processing.

Exemplary Embodiment 23 provides a method of processing reference picture request. FIG. 7 presents the flow chart of the embodiment. The embodiment comprises:

Step 501: Obtain dependency map table of at least one first segment, wherein the dependency map table describes the mapping relation between the reference picture identifier of at least one reference picture depended on by the said first segment and the location information of the second segment containing the said reference picture;

Step 502: Obtain the reference picture identifier of at least one reference picture depended on by the current picture by receiving request of reference picture sent by a decoder;

Step 503: Obtain location information of at least one second segment, which contains reference picture indicated by the reference picture identifier of the reference picture recorded in the request information, from the dependency map table of the first segment containing the current picture;

Step 504: Send information of the library picture contained by the second segment, which is located by the location information of the second segment, to the decoder.

Exemplary Embodiment 24 provides a method of processing reference picture request, which changes from Exemplary Embodiment 23, with the difference of:

Step 601: Obtain dependency map table of at least one first segment from media presentation description.

Exemplary Embodiment 25 provides a method of processing reference picture request, which changes from Exemplary Embodiment 24, with the difference of:

In the standard of Dynamic Adaptive Streaming over HTTP(DASH), Media Presentation Description (MPD) exploits segment dependency descriptor to signal the dependency map table information of the segment the descriptor belongs to. The descriptor is defined as dependent_segmentin which property indicator @dependent_segment_indicator carries the location of a second segment and the identifier information of the library pictures in the segment, which is depended on by a first segment containing the dependent_segment descriptor. The identifier information is carried by property indicator@pictureID and the location information by property indicator @dependentSegmentURL. Table 4 depicts a syntax example of the segment dependency descriptor.

TABLE 4

A syntax example of the segment dependency descriptor

```
<?xml version="1.0" encoding="UTF-8"?>
<xs:schema xmlns:xs="http://www.w3.org/2001/XMLSchema"
  targetNamespace="urn:avs:ims:2018"
  xmlns ims="urn:avs:ims:2018 "
  elementFormDefault="qualified">
  <xs:elementname="dependent_segment"
  type="ims:DependentSegmentType"/>
  <xs:complexTypename="DependentSegmentType"/>
  <xs:sequence>
  <xs:elementname="dependent_segment_indicator"
type="ims:DependentSegmentIndicatorType" minOccurs="0"
maxOccurs="unbounded"/>
  <xs:any namespace="##other" processContents="lax" minOccurs="( )"
maxOccurs="unbounded"/>
    <xs:sequence>
  </xs:complexType>
    <xs:complexType name="DependentSegmentIndicatorType ">
<xs:attribute name="pictureID" type="xs:string">
    <xs:attribute name="dependentSegmentURL" type="xs:anyURL">
    </xs:complexType>
  </xs:schema>
```

The semantic of the above syntax is shown in Table 5.

TABLE 5

A semantic example of the syntax in the segment dependency descriptor

| Element and property of the segment dependency descriptor | Usage | Description |
| --- | --- | --- |
| dependent_segment | 0..1 | Contain elements and properties of the segment that has dependency relation with the target segment. |
| dependent_segment: @dependent_segment_ indicator | Mandatory | According to the dependency relation between segments, indicate the location and identifier information of the segment depended on by the target segment. |
| ims:DependentSegment IndicatorType | Optional | Describe the location and identifier information of the segment depended on by the target segment. |
| ims:DependentSegment IndicatorType@pictureID | Mandatory | Describe the identifier information of the segment depended on by the target segment. |
| ims:DependentSegment IndicatorType@ dependentSegmentURL | Mandatory | Describe the location information of the segment depended on by the target segment. |

Exemplary Embodiment 26 provides a method of processing reference picture request, which changes from Exemplary Embodiment 25, with the difference of:

While in the file format layer that transmits file or encapsulated unit, sample entry box LayerSMTHintSampleEntry is used to describe the sample entry of the bitstream containing the library picture and/or sequence picture. Syntax_is_library_layer is used to signal whether the bitstream containing library picture or sequence picture. Sample data boxLayerMediaSample describes the samples of the bitstream containing sequence picture. The box LayerInfo describes the index of the bitstream and the sample containing library picture that is depended on by the bitstream or sample corresponding to the LayerInfo box. In the box LayerInfo, element library_layer_in_ceu_sequence_number is used to describe the index of the common encapsulated unit (CEU) containing the bitstream or sample of dependent library picture, and element library_layer_in_mfu_sequence_number describes the index of the minimum fragment unit (MFU) in the CEU containing the bitstream or sample of dependent library picture. Detailed syntax and semantic is as follows:

```
aligned(8) class LayerSMTHintSampleEntry( )
    extends SMTHintSampleEntry('layh') {
    unsigned int(1) has_mfus_flag;
    unsigned int(1) is_library_layer;
    unsigned int(6) reserved;
}
```

Semantic:

has_mfus_flag—indicates whether the CEU is fragmented into MFU. Equal to 1 means that CEU is fragmented into MFU, each of which corresponds to a hint sample. Equal to 0 means that a CEU contain only one MFU.

is_library_layer—indicates whether the media data, corresponding to the hint track, is library layer media data. Equal to 1 means that the media data is library layer media data which contains bitstream of library picture. Equal to 0 means that the media data is video layer media which contains bitstream of sequence picture.

```
aligned (8) LayerMediaSample( ) {
    unsigned int(32) sequence_number;
    signed int(8) trackrefindex;
        unsigned int(32) samplenumber;
        unsigned int(16) offset;
        unsigned int(32) length;
        if (is_library_layer==0) {
    LayerInfo( );
        }
}
aligned(8) class LayerInfo extends Box('laye') {
    bit(32) library_layer_in_ceu_sequence_number;
    bit(32) library_layer_in_mfu_sequence_number;
}
```

Semantic:

sequence_number—Sequence number of the MFU in CEU.

trackrefindex—Index of the media track from which the MFU is extracted.

samplenumber—Index of the sample from which the MFU is extracted. Samplenumber n indicates the sample corresponding to the n-th 'moof' box in CEU. The samplenumber of the first sample in a CEU should be 0.

offset—Indicates the offset of the location, start from the 'mdat' box, of the media data corresponding to the target MFU.

length—Indicates the byte length of the media data corresponding to the target MFU.

library_layer_in_ceu_sequence_number—Indicates the index of the CEU, in the library layer media asset, containing the MFU that is depended on by the target MFU.

library_layer_in_mfu_sequence_number—Indicates the index of the MFU that is depended on by the target MFU.

Figure 8:
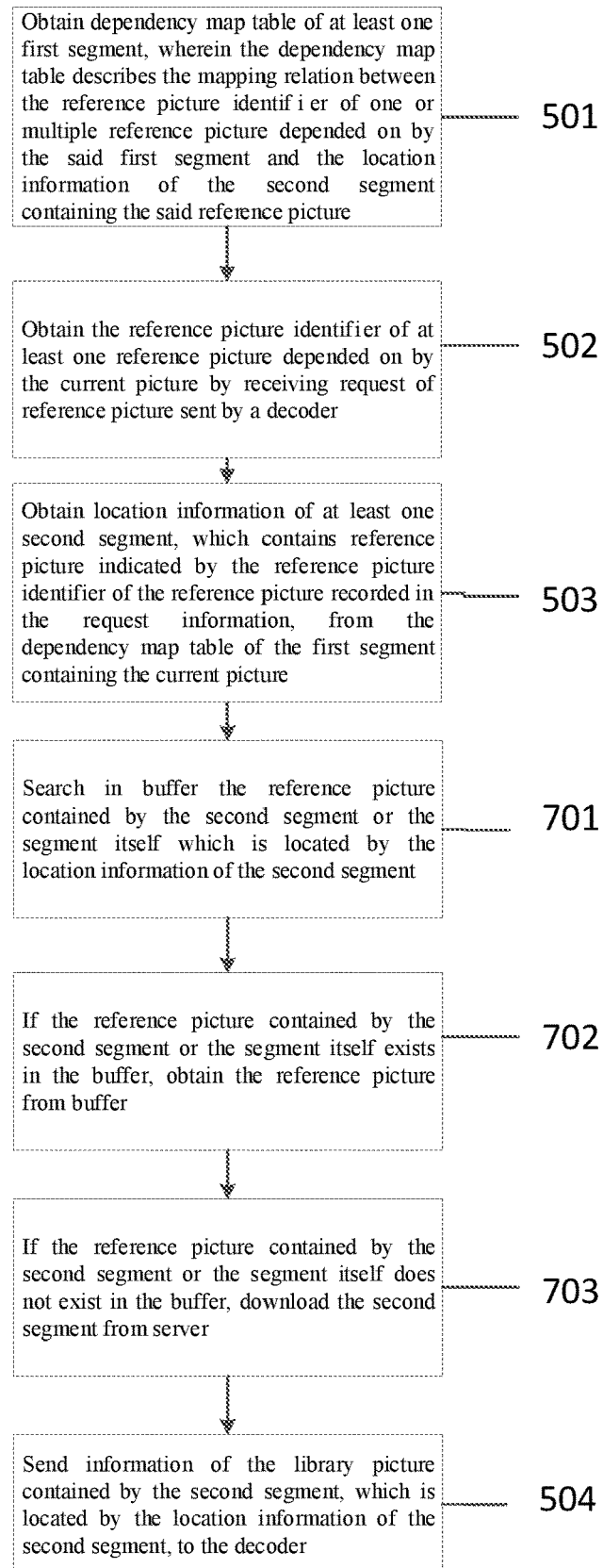
FIG. 8 The flow chart of another embodiment provided by this invention for methods of reference picture request processing.

Exemplary Embodiment 27 provides a method of processing reference picture request as shown in FIG. 8, which changes from Exemplary Embodiment 23, with the difference of: the step 404, which sends information of the library picture contained by the second segment located by the location information of the second segment to the decoder, further comprises:

Step 701: Search in buffer the reference picture contained by the second segment or the segment itself which is located by the location information of the second segment;

Step 702: If the reference picture contained by the second segment or the segment itself exists in the buffer, obtain the reference picture from buffer;

Step 703: If the reference picture contained by the second segment or the segment itself does not exist in the buffer, download the second segment from server.

Exemplary Embodiment 28 provides a method of processing reference picture request, which changes from Exemplary Embodiment 23, with the difference of:

The second segment contains one library picture.

Exemplary Embodiment 29 provides a method of processing reference picture request, which changes from Exemplary Embodiment 23, with the difference of:

The location information includes but not limited to Uniform Resource Locator (URL) or Uniform Resource Identifier (URI).

Exemplary Embodiment 30 provides a method of processing reference picture request, which changes from Exemplary Embodiment 23, with the difference of:

The information of the library picture contained by the second segment located by the location information of the second segment, which is sent to the decoder, is pixel value of the library picture.

Exemplary Embodiment 31 provides a method of processing reference picture request, which changes from Exemplary Embodiment 23, with the difference of:

The information of the library picture contained by the second segment located by the location information of the second segment, which is sent to the decoder, is memory location of the library picture.

Exemplary Embodiment 32 provides a method of processing reference picture request, which changes from Exemplary Embodiment 23, with the difference of:

Downloading the second segment from server is realized by sending HTTP-request to the server via HTTP transport protocol.

Figure 9:
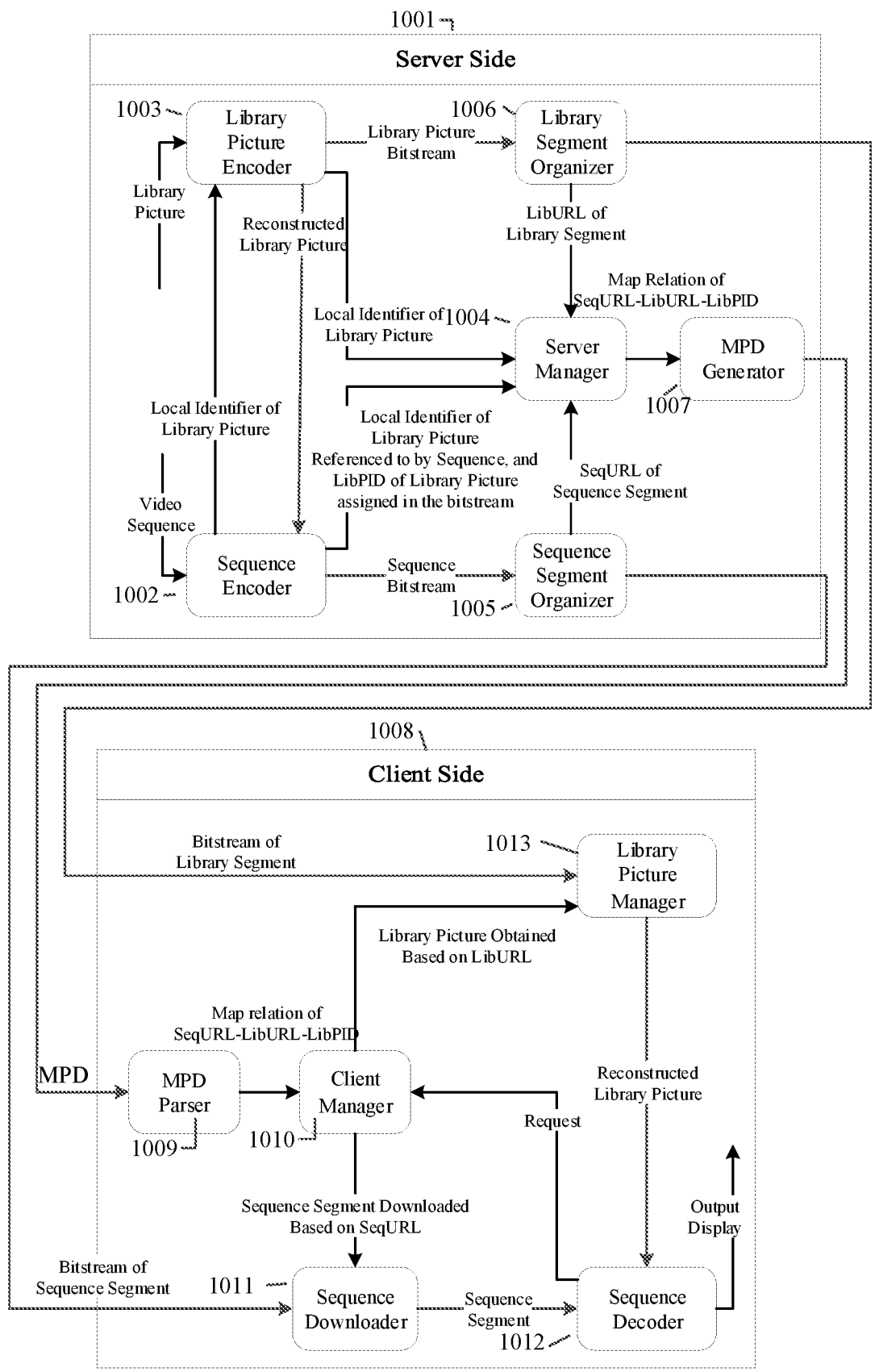
FIG. 9 The framework example of an embodiment provided by this invention for apparatus of reference picture specifying and reference picture request processing.

Exemplary Embodiment 33 provides a combined method of specifying reference picture and processing reference picture request, which changes from Exemplary Embodiment 1 and Exemplary Embodiment 23, with the difference of:

FIG. 9 depicts the Exemplary Embodiment 33. At the server side 1001, sequence encoder 1002 receives video sequence to be encoded and encodes the coding picture in encoding order. If the current coding picture references to at least one library picture, the sequence encoder 1002 selects at least one library picture from the library picture set that is locally available, constructs reference picture set, and informs the library picture encoder 1003 about the local identifier of the referenced library picture. Library picture encoder 1003 encodes and reconstructs the library picture according to the given library picture identifier and sends the reconstructed library picture to the sequence encoder 1002. Server manager 1004 receives the local identifier and the identifier, e.g. referred to as LibPID, signaled in the library layer bitstream of the library picture, receives location information, e.g. referred to as SeqURL, of the RAS containing the current coding picture from the sequence segment organizer 1005, and receives the local identifier of the library picture from library picture encoder 1003, receives location information, referred to as LibURL, of the segment containing library picture from the library segment organizer 1006, and generates dependency map table for every sequence segment according to the above information. For every sequence segment, the dependency map table records the LibPID of the library picture, depended on by the sequence segment, as well as the LibURL of the library segment containing the dependent library picture. MPD generator 1007 receives dependency map table from server manager 1004 and generates MPD file according to the information of the dependency map table.

At the client side 1008 as shown in FIG. 9, MPD parser 1009 receives MPD sent from server side 1001 and parse to obtain dependency map table of at least one sequence segment. Client manager 1010 decides the SeqURL of the sequence segment to be downloaded according to the current presentation time. Sequence downloader 1011 downloads sequence segment from the server side 1001 according to the SeqURL. Sequence decoder 1012 receives sequence segment, decodes the bitstream in the segment, and decides whether the current decoding picture references to library picture according to the decoded dependency map table carried in the bitstream. If the current decoding picture depends on library picture, sequence decoder 1012 sends library picture request, according to the LibPID of dependent library picture recorded in the dependency map table, to client manager 1010. The client manager 1010 searches the LibURL, from the dependency map table, that corresponds to the LibPID contained in the request. Library picture manager 1013 receives LibURL, and, in one possible method, checks whether there exists in the local library buffer the library picture contained in the library segment indicated by the LibURL. If it does exist, library picture manager 1013 fetches the dependent library picture, corresponding to the LibPID, from the local library buffer and provides it to sequence decoder 1012. Otherwise, if it does not exist, the client side 1008 downloads the library segment, according to the LibURL, from the server side 1001, decodes the library picture in the segment, and provides the reconstructed library picture to sequence decoder 1012. The sequence decoder 1012 decodes the current decoding picture by referencing to the given library picture, and displays or outputs the reconstructed current picture.

Figure 10:
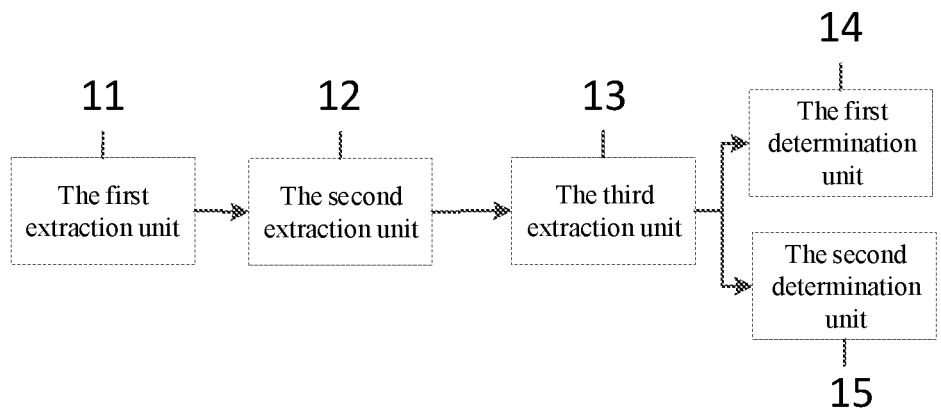
FIG. 10 The structure of an embodiment provided by this invention for apparatus of reference picture specifying.
Figure 11:
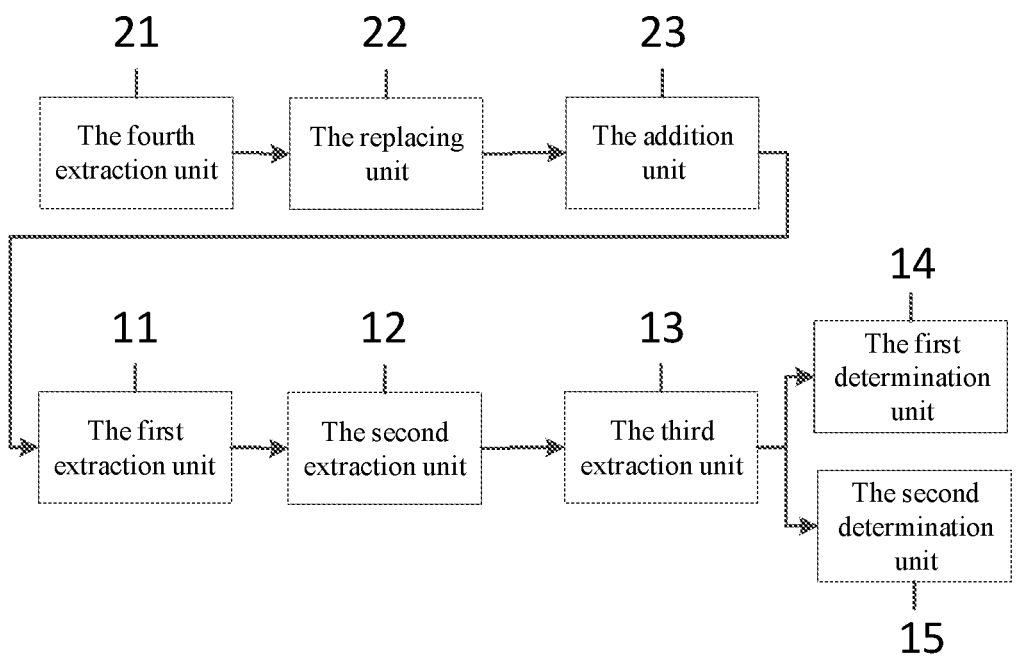
FIG. 11 The structure of another embodiment provided by this invention for apparatus of reference picture specifying.

Exemplary Embodiment 34 provides an apparatus of specifying reference picture, with FIG. 10 depicts a possible example:

The first extraction unit 11: used to extract the first signaling flag in reference mapping table, which is used to indicate whether the numeration method of a reference picture identifier that corresponds to a reference index in the reference mapping table use mixed numeration principles;

The first extraction unit 12: When the numeration method of a reference picture identifier that corresponds to the reference index in reference mapping table adopts mixed numeration principles, it is used to extract the second signaling flag corresponding to at least a reference index j in the reference mapping table, where the second signaling flag is used to extract a numeration principle of the reference picture identifier corresponding to the reference index j;

The third extraction unit 13: used to extract the reference picture identifier corresponding to the reference index j from the reference mapping table;

The first specification unit 14: When the numeration principle for the reference picture identifier is the first numeration principle, it is used to adopt the same numeration principle with the current picture identifier's numeration principle and to specify the reference picture of current picture with the reference picture identifier;

The second specification unit 15: When the numeration principle for the reference picture identifier is the second numeration principle, it is used to obtain the reference picture information returned from outside of decoder using the reference picture identifier and to specify the reference picture of current picture.

Exemplary Embodiment 35 provides an apparatus of specifying reference picture, which changes from Exemplary Embodiment 34, with the difference of:

In Video Coding Standard AVS3, reference_configuration_set denotes the reference mapping table, the first extraction unit 11 is used to extract syntax reference_to_library_enable_flag from reference_configuration_set, where reference_to_library_enable_flag is used to indicate whether the numeration method of a reference picture identifier that corresponds to a reference index in the reference mapping table uses mixed numeration principles. When the numeration method of a reference picture identifier that corresponds to the reference index in reference mapping table adopts mixed numeration principles, the second extraction unit 12 is used to extract the second signaling flag corresponding to at least a reference index j in the reference mapping table, where the second signaling flag is used to extract a numeration principle of the reference picture identifier corresponding to the reference index j from reference_configuration_set. The third extraction unit 3 is used to extract reference picture identifier, i.e. library_pid or delta_doi_of_reference_picture, corresponding to the reference index j from reference_configuration_set. If the third extraction unit 13 extracts delta_doi_of_reference_picture, the first specification unit 14 adopts the same numeration principle with the current picture identifier's numeration principle and specify the reference picture of current picture with the reference picture identifier. If the third extraction unit 13 extracts library_pid, the second specification unit 15 is used to obtain the reference picture information returned from outside of decoder using the reference picture identifier and to specify the reference picture of current picture.

Exemplary Embodiment 36 provides an apparatus of specifying reference picture, which changes from Exemplary Embodiment 34, with the difference of:

The reference mapping table used by the first extraction unit 11, the second extraction unit 12 and the third extraction unit 13 is contained in the sequence header, picture header or slice header.

Exemplary Embodiment 37 provides an apparatus of specifying reference picture, which changes from Exemplary Embodiment 34, with the difference of:

The fourth extraction unit 21: used to extract an updated reference mapping table and obtain at least one reference picture identifier and second signaling flag, wherein the corresponding reference index of any one of those reference picture identifiers and second signaling flags is denoted as j, from the updated reference mapping table;

The replacing unit 22: when the reference index j in the updated reference mapping table exists in the reference mapping table, it is used to replace the reference picture identifier and the second signaling flag corresponding to the reference index j in the reference mapping table with the reference picture identifier and the second signaling flag corresponding to the reference index j in the updated reference mapping table;

The addition unit 23: when the reference index j in the updated reference mapping table does not exist in the reference mapping table, it is used to add the reference index j and the corresponding reference picture identifier as well as the second signaling flag from the updated reference mapping table to the reference mapping table.

Exemplary Embodiment 38 provides an apparatus of specifying reference picture, which changes from Exemplary Embodiment 37, with the difference of:

When the updated reference mapping table only includes at least one pair of reference index and the corresponding reference picture identifier following the second numeration principle, the replacing unit 22 is also used to replace the reference picture identifier corresponding to the reference index j in the reference mapping table with the reference picture identifier corresponding to the reference index j in the updated reference mapping table, and marks the second signaling flag corresponding to the reference index j in the reference mapping table as adopting the second numeration principle;

Exemplary Embodiment 39 provides an apparatus of specifying reference picture, which changes from Exemplary Embodiment 37, with the difference of:

When the updated reference mapping table only includes at least one pair of reference index and the corresponding reference picture identifier following the second numeration principle, the addition unit 23 is used to add the reference index j and the corresponding reference picture identifier from the updated reference mapping table to the reference mapping table, and marks the second signaling flag corresponding to the reference index j in the reference mapping table as adopting the second numeration principle.

Exemplary Embodiment 40 provides an apparatus of specifying reference picture, which changes from Exemplary Embodiment 34, with the difference of:

The setting unit 33: When decoder decodes current picture using a reference picture, where the reference picture is obtained from a reference picture identifier using the second numeration principle, the unit sets the distance between the reference picture and current picture as non-temporal distance.

Exemplary Embodiment 41 provides an apparatus of specifying reference picture, which changes from Exemplary Embodiment 40, with the difference of:

The setting unit 33 is used to set the distance between the reference picture and current picture as a pre-determined non-zero constant value.

Exemplary Embodiment 42 provides an apparatus of specifying reference picture, which changes from Exemplary Embodiment 40, with the difference of:

The setting unit 33 is used to set the distance between the reference picture and current picture as a non-zero value calculated from the similarity between the reference picture with reference picture identifier adopting the second numeration principle and the current picture.

Exemplary Embodiment 43 provides an apparatus of specifying reference picture, which changes from Exemplary Embodiment 34, with the difference of:

The fifth extraction unit 41: used to extract a third signaling flag and determine whether the first signaling flag exists in the reference mapping table.

Exemplary Embodiment 44 provides an apparatus of specifying reference picture, which changes from Exemplary Embodiment 43, with the difference of:

In Video Coding Standard AVS3, the fifth extraction unit 41 is used to extract the third signaling flag represented by library_picture_enable_flag from sequence header.

Figure 12:
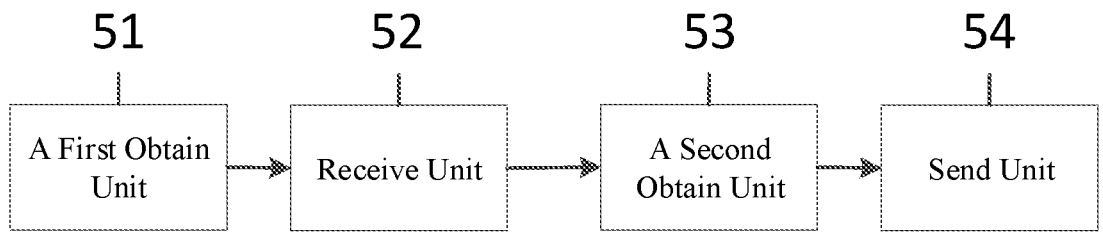
FIG. 12 The structure of an embodiment provided by this invention for apparatus of reference picture request specifying.

Exemplary Embodiment 45 provides an apparatus of processing reference picture request. As shown in FIG. 12, the apparatus comprises:

A first obtain unit 51 to obtain dependency map table of at least one first segment to obtain the map relation between the reference picture identifier of at least one reference picture depended on by the said first segment and the location information of the second segment containing the said reference picture;

Receive unit 52 to obtain the reference picture identifier of at least one reference picture depended on by the current picture by receiving request of reference picture sent by a decoder;

A second obtain unit 53 to obtain location information of at least one second segment, which contains reference picture indicated by the reference picture identifier of the reference picture recorded in the request information, from the dependency map table of the first segment containing the current picture;

Send unit 54 to send information of the reference picture contained by the second segment, which is located by the location information of the second segment, to the decoder.

Exemplary Embodiment 46 provides an apparatus of processing reference picture request, which changes from Exemplary Embodiment 45, with the difference of:

A third obtain unit 61 to obtain dependency map table of at least one first segment from media presentation description.

Exemplary Embodiment 47 provides an apparatus of processing reference picture request, which changes from Exemplary Embodiment 46, with the difference of:

In DASH, a third obtain unit 61 to obtain a segment dependency descriptor dependent_segment of at least one first segment from the MPD. From at least one property dependent_segment_indicator in the descriptor dependent_segment, the unit also obtains location information dependentSegmentURL of a second segment, depended on by the first segment, and the identifier information pictureID of the library picture contained in the second segment.

Figure 13:
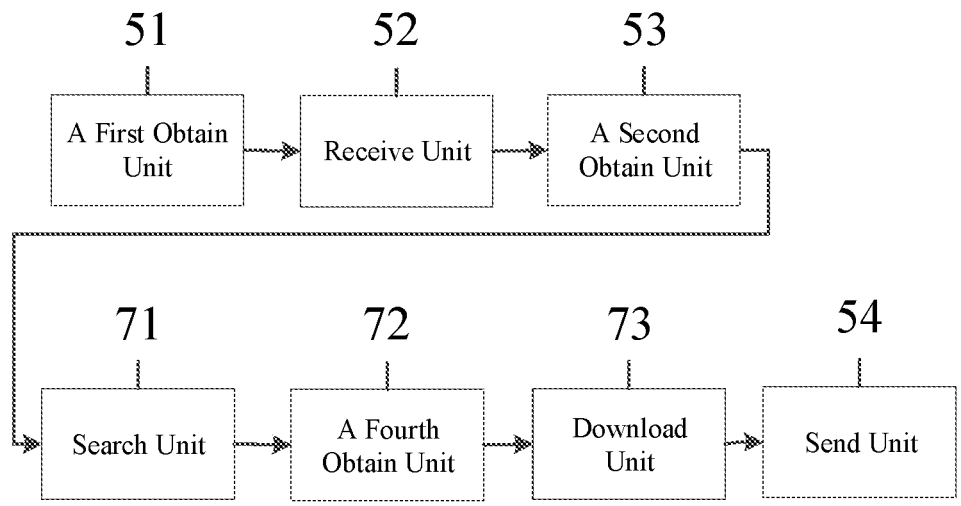
FIG. 13 The structure of another embodiment provided by this invention for apparatus of reference picture request specifying.

Exemplary Embodiment 48 provides an apparatus of processing reference picture request as shown in FIG. 13, which changes from Exemplary Embodiment 45, with the difference of that the send unit 54 also comprises:

Search unit 71 to search in buffer the library picture contained by the second segment or the segment itself which is located by the location information of the second segment;

If the library picture contained by the second segment or the segment itself exists in the buffer, a fourth obtain unit 72 to obtain the library picture from buffer;

If the library picture contained by the second segment or the segment itself does not exist in the buffer, download unit 73 to download the second segment from server.

Exemplary Embodiment 49 provides an apparatus of processing reference picture request, which changes from Exemplary Embodiment 45, with the difference of:

Send unit 54 sends the pixel value of the library picture, which is contained by the second segment located by the location information of the second segment, to the decoder.

Exemplary Embodiment 50 provides an apparatus of processing reference picture request, which changes from Exemplary Embodiment 45, with the difference of:

Send unit 54 sends the memory location of the library picture, which is contained by the second segment located by the location information of the second segment, to the decoder.

Exemplary Embodiment 51 provides an apparatus of processing reference picture request, which changes from Exemplary Embodiment 48, with the difference of:

Download unit 73 downloads the second segment by sending HTTP-request to the server via HTTP transport protocol.

Figure 14:
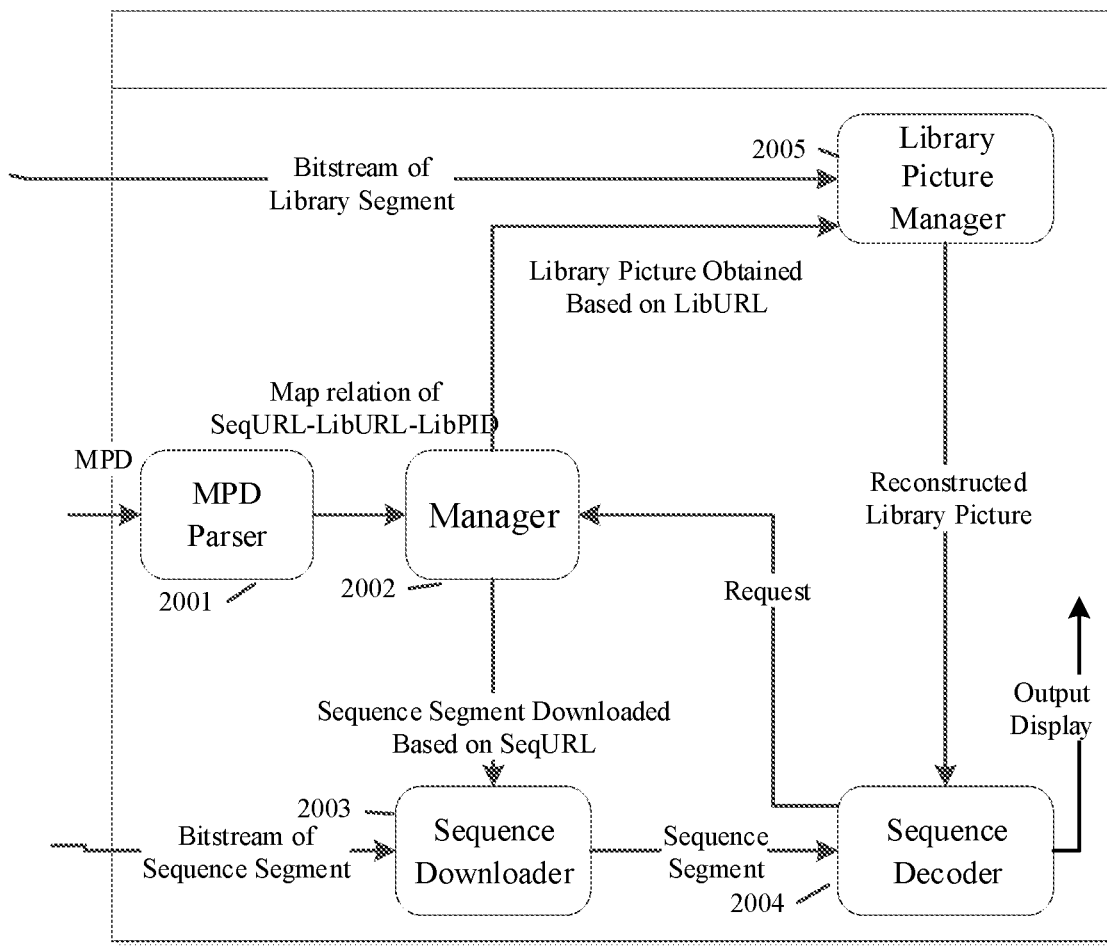
FIG. 14 The framework example of an embodiment provided by this invention for methods of reference picture specifying and reference picture request processing.

Exemplary Embodiment 52 provides a combined method of specifying reference picture and processing reference picture request, which changes from Exemplary Embodiment 34 and Exemplary Embodiment 45, with the difference of:

As shown in FIG. 14, MPD parser 2001 receives MPD and parse to obtain dependency map table of at least one sequence segment. Manager 2002 decides the SeqURL of the sequence segment to be downloaded according to the current presentation time. Sequence downloader 2003 downloads sequence segment according to the SeqURL. Sequence decoder 2004 receives sequence segment, decodes the bitstream in the segment, and decides whether the current decoding picture references to library picture according to the decoded dependency map table carried in the bitstream. If the current decoding picture depends on library picture, sequence decoder 2004 sends library picture request, according to the LibPID of dependent library picture recorded in the dependency map table, to manager 2002. The manager 2002 searches the LibURL, from the dependency map table, that corresponds to the LibPID contained in the request. Library picture manager 2005 receives LibURL, and, in one possible method, checks whether there exists in the local library buffer the library picture contained in the library segment indicated by the LibURL. If it does exist, library picture manager 2005 fetches the dependent library picture from the local library buffer and provides it to sequence decoder 2004. Otherwise, if it does not exist, the library picture manager 2005 downloads the library segment, decodes the library picture in the segment, and provides the reconstructed library picture to sequence decoder 2004. The sequence decoder 2004 decodes the current decoding picture by referencing to the given library picture, and displays or outputs the reconstructed current picture.

Figure 15:
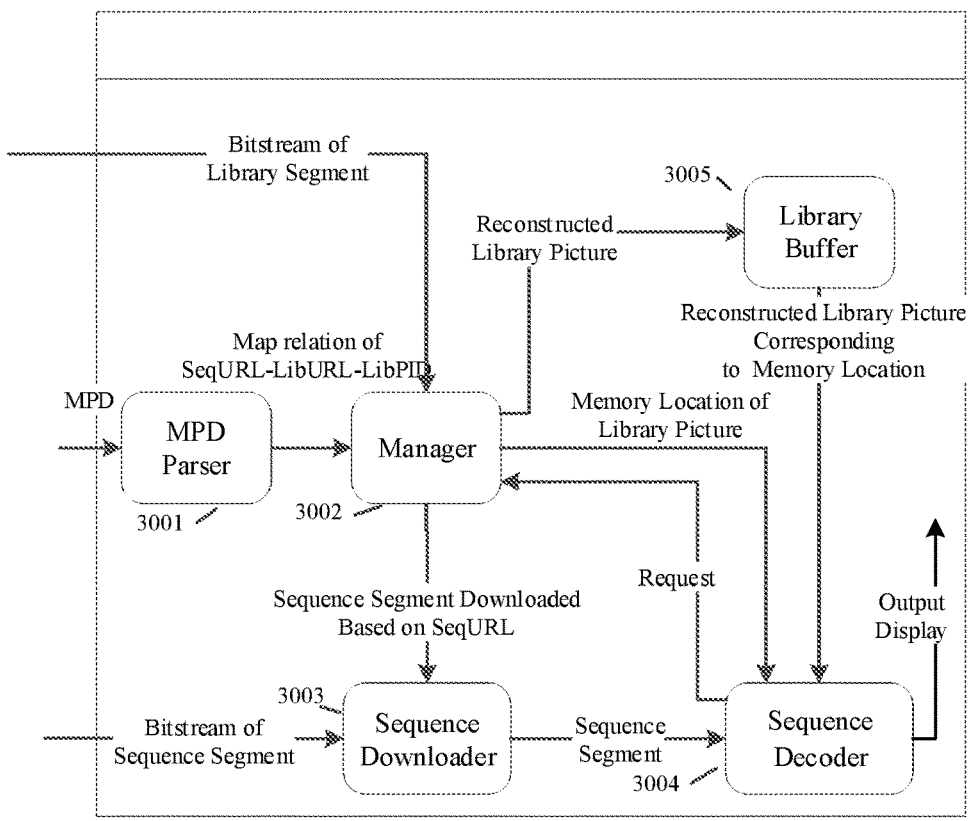
FIG. 15 The framework example of an embodiment provided by this invention for methods of reference picture specifying and reference picture request processing.

Exemplary Embodiment 53 provides a combined method of specifying reference picture and processing reference picture request, which changes from Exemplary Embodiment 34 and Exemplary Embodiment 45, with the difference of:

As shown in FIG. 15, MPD parser 3001 receives MPD and parse to obtain dependency map table of at least one sequence segment. Manager 3002 decides the SeqURL of the sequence segment to be downloaded according to the current presentation time. Sequence downloader 3003 downloads sequence segment according to the SeqURL. Sequence decoder 3004 receives sequence segment, decodes the bitstream in the segment, and decides whether the current decoding picture references to library picture according to the decoded dependency map table carried in the bitstream. If the current decoding picture depends on library picture, sequence decoder 3004 sends library picture request, according to the LibPID of dependent library picture recorded in the dependency map table, to manager 3002. The manager 3002 searches the LibURL, from the dependency map table, that corresponds to the LibPID contained in the request. According to the LibURL, manager 3002 checks whether there exists in the local library buffer 3005 the library picture contained in the library segment indicated by the LibURL. If it does exist, manager 3002 sends the memory location of the dependent library picture in the local library buffer 3005 to sequence decoder 3004. Otherwise, if it does not exist, manager 3002 downloads the library segment, decodes the library picture in the segment, stores the reconstructed library picture in the local library buffer 3005, and then sends the memory location of the dependent library picture in the local library buffer 3005 to sequence decoder 3004. The sequence decoder 3004 fetches the library picture from the library buffer 3005 according to the given memory location, decodes the current decoding picture by referencing to the fetched library picture, and displays or outputs the reconstructed current picture.

Figure 16:
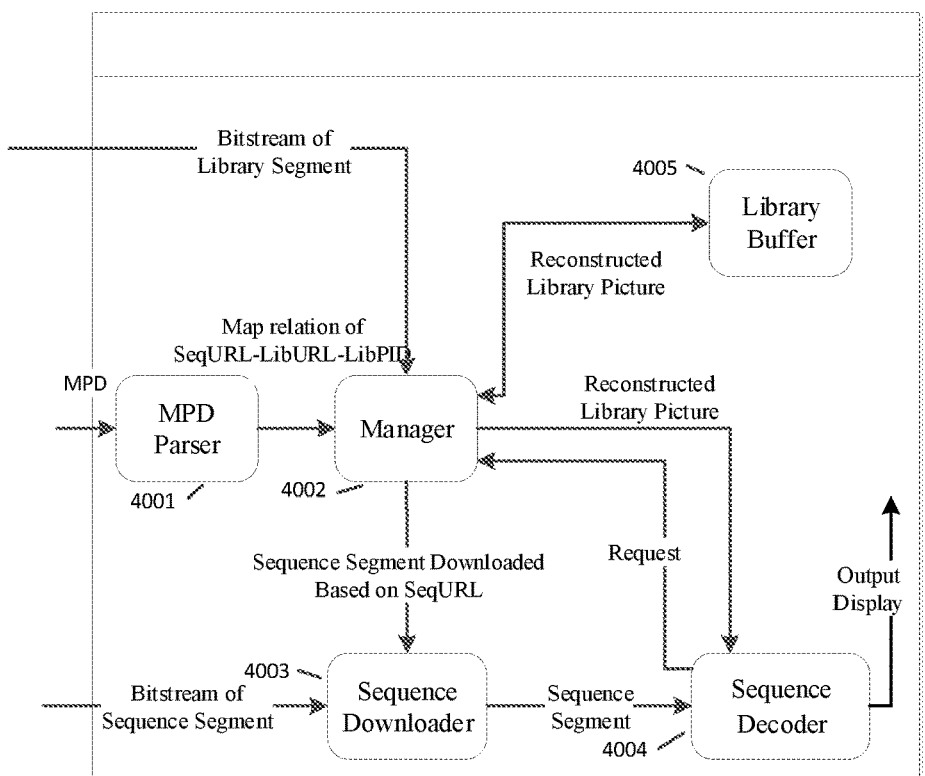
FIG. 16 The framework example of an embodiment provided by this invention for methods of reference picture specifying and reference picture request processing.

Exemplary Embodiment 54 provides a combined method of specifying reference picture and processing reference picture request, which changes from Exemplary Embodiment 34 and Exemplary Embodiment 45, with the difference of:

As shown in FIG. 16, MPD parser 4001 receives MPD and parse to obtain dependency map table of at least one sequence segment. Manager 4002 decides the SeqURL of the sequence segment to be downloaded according to the current presentation time. Sequence downloader 4003 downloads sequence segment according to the SeqURL. Sequence decoder 4004 receives sequence segment, decodes the bitstream in the segment, and decides whether the current decoding picture references to library picture according to the decoded dependency map table carried in the bitstream. If the current decoding picture depends on library picture, sequence decoder 4004 sends library picture request, according to the LibPID of dependent library picture recorded in the dependency map table, to manager 4002. The manager 4002 searches the LibURL, from the dependency map table, that corresponds to the LibPID contained in the request. According to the LibURL, manager 4002 checks whether there exists in the local library buffer 4005 the library picture contained in the library segment indicated by the LibURL. If it does exist, manager 4002 fetches the dependent library picture from the local library buffer 4005 and sends it to sequence decoder 4004. Otherwise, if it does not exist, manager 4002 downloads the library segment, decodes the library picture in the segment, stores the reconstructed library picture in the local library buffer 4005, and then sends the reconstructed library picture in the local library buffer 4005 to sequence decoder 4004. The sequence decoder 4004 decodes the current decoding picture by referencing to the given library picture, and displays or outputs the reconstructed current picture.

Figure 17:
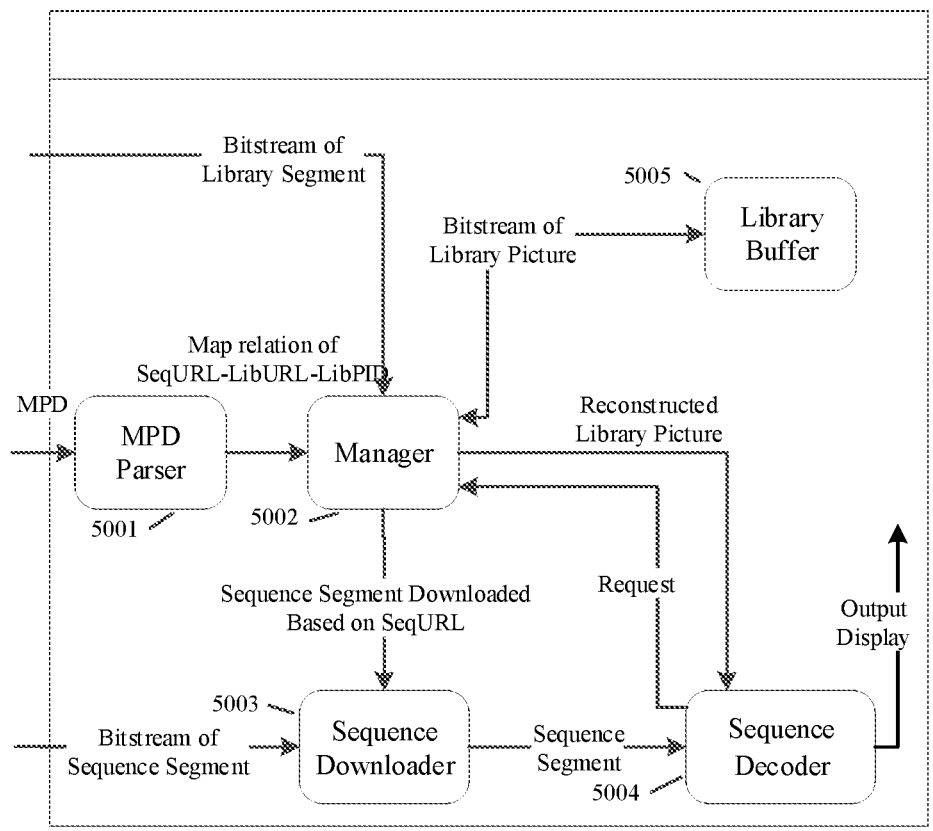
FIG. 17 The framework example of an embodiment provided by this invention for methods of reference picture specifying and reference picture request processing.

Exemplary Embodiment 55 provides a combined method of specifying reference picture and processing reference picture request, which changes from Exemplary Embodiment 34 and Exemplary Embodiment 45, with the difference of:

As shown in FIG. 17, MPD parser 5001 receives MPD and parse to obtain dependency map table of at least one sequence segment. Manager 5002 decides the SeqURL of the sequence segment to be downloaded according to the current presentation time. Sequence downloader 5003 downloads sequence segment according to the SeqURL. Sequence decoder 5004 receives sequence segment, decodes the bitstream in the segment, and decides whether the current decoding picture references to library picture according to the decoded dependency map table carried in the bitstream. If the current decoding picture depends on library picture, sequence decoder 5004 sends library picture request, according to the LibPID of dependent library picture recorded in the dependency map table, to manager 5002. The manager 5002 searches the LibURL, from the dependency map table, that corresponds to the LibPID contained in the request. According to the LibURL, manager 5002 checks whether there exists in the local library buffer 5005 the coded library picture contained in the library segment indicated by the LibURL. If it does exist, manager 5002 fetches the dependent coded library picture from the local library buffer 4005, decodes the library picture and sends the reconstructed library picture to sequence decoder 5004. Otherwise, if it does not exist, manager 5002 downloads the library segment, stores the coded library picture from the library segment in the local library buffer 5005, decodes the coded library picture, and then sends the reconstructed library picture to sequence decoder 5004. The sequence decoder 5004 decodes the current decoding picture by referencing to the given library picture, and displays or outputs the reconstructed current picture.

Figure 18:
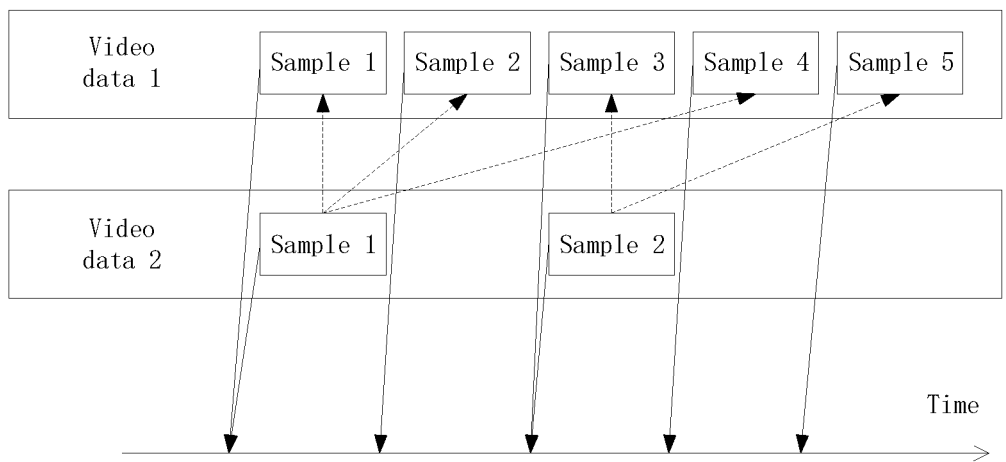
FIG. 18 The dependency relation example of the media data provided by an embodiment of this invention, wherein the media data is generated by library-based video coding.

Exemplary Embodiment 56 provides a method to produce media data. FIG. 18 shows the dependency relation of the media data generated by library-based video coding. The media data generated by library-based video coding contains two parts: the first video data and the second video data, wherein the first video data is referred to as video layer data which contains the bitstream of the video layer picture, and the second video data is referred to as library layer data which contains the bitstream of the library layer picture. The video data contains at least one sample, wherein the sample contains a picture or a group of pictures. The samples of the first video data are assigned identifiers which are arranged in order according to a first numeration principle. The first numeration principle is a rule for assigning identifiers according to temporal order, playback order or decoding order. The samples of the second video data are assigned identifiers which are arranged in order according to a second numeration principle. The second numeration principle is a rule for assigning identifiers according to the usage order, generation order, or storage order. At least one sample in the second video data is depended on by two or more discontinuous samples in the first video data and provides reference information for encoding and decoding of the said two or more discontinuous samples in the first video data. This dependency relation is referred to as the non-temporally-aligned dependency.

In order to realize the dependency relation between the video data 1 and the video data 2, the video data 1 and video data 2 need to be encoded and decoded synchronously. Multiple samples in the video data 1 depend on the same sample in the video data 2. For example, in FIG. 18, the dashed arrow indicates the dependency between samples, i.e. sample 1, sample 2, and sample 4 in the video data 1 depend on sample 1 in the video data 2, and sample 3 and sample 5 in the video data 1 depend on sample 2 in the video data 2. When the video data 1 is presented in temporal order, such as the presentation time order indicated by the solid arrow in FIG. 18, the dependent samples in the video data 2 need to be synchronized with the samples in the video data 1 depending on the said dependent samples to ensure the correct decoding of the samples in the video data 1. In order to avoid wasting storage resources or transmission bandwidth, the samples in video data 2 that are depended on by multiple samples in video data 1 are not stored or transmitted repeatedly but shared. For example, in FIG. 18, after being used by the sample 1 in video data 1, the sample 1 in video data 2 will be reused by the subsequent sample 2 and sample 4 in video data 1. Based on the above dependency relation of the media data encoded by the library-based coding method, the present invention provides a method of storing media data and a method of extracting media data bitstream. The dependency relation example in FIG. 18 is also applicable to the description of the dependency relation in the following exemplary embodiments.

Figure 19:
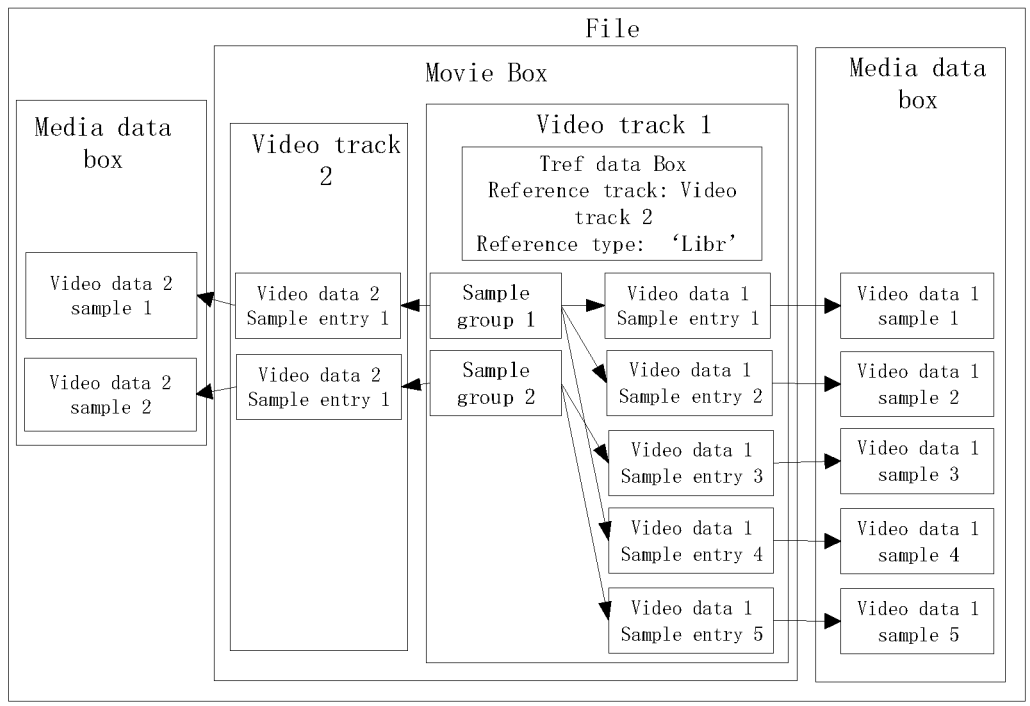
FIG. 19 The example of an embodiment provided by this invention to produce media data.

Exemplary Embodiment 57 provides a method to produce media data as shown in FIG. 19. The media data box and the metadata box "Movie Box" are stored in one file. In another case, the media data box and "Movie Box" are stored in different files. In order to describe the dependency between the video data 1 and the video data 2, two tracks are used in the "Movie Box" to describe the samples in video data 1 and the samples in video data 2, respectively. As shown in FIG. 19, video track 1 describes the structure of the samples in video data 1 and video track 2 describes the structure of the samples in video data 2. The 'tref' data box (Track Reference Box) in video track 1 is used to describe the dependency between video track 1 and video track 2. In order to identify that the type of the dependency between the two tracks is the dependency between the video data 1 and the video data 2, it is necessary to add a new value to the reference type of the 'tref' data box, e.g. value 'libr' can be used as the type indicator. When the value of the reference type is 'libr', it indicates that this is a special reference type, that is, the sample pointed to by the current video track 1 depends on the sample pointed to by the video track 2, wherein the video track 2 is pointed to by the track identifier in the 'tref' box.

After describing the dependency between the track of video data 1 and the track of video data 2, it is necessary to describe the dependency between the samples. Since the samples in video data 1 and the samples in video data 2 use different sequential numeration principles. For example, the samples in video data 1 use temporal order and the samples in video data 2 use non-temporally-aligned order. Thus, the dependency between samples cannot be described by time stamps. In this exemplary embodiment, Sample Group Box and Sample Group Description Box are used to describe that multiple samples in video data 1 depend on one sample in video data 2. As shown in FIG. 19, sample group 1 in the video track 1 points to sample entry 1, sample entry 2, and sample entry 4 in the video track 1, and, meanwhile, records the sample entry 1 in the video track 2. It means that the said sample pointed to by sample entry 1 in the video track 2 is depended on by those samples pointed to by the sample entry 1,2,4 in the video track 1. Sample group 2 in the video track 1 points to the sample entry 3 and sample entry 5 in the video data 1, and records the sample entry 2 in the video track 2. It means that the samples pointed to by the sample entry 3 and sample entry 5 in video data 1 depend on the sample pointed to by the sample entry 2 in video data 2. Therefore, the sample group needs to describe the information of the sample entry in the video data 2, and the following syntax is required:

```
class LibrarySampleGroupEntry extend
VisualSampleGroupEntry ('libg'){
    unsigned int (32) num_library_samples;
    for( i=0; i<num_library_samples; i++) {
        unsigned int (32) library_sample_index;
    }
}
```

The corresponding semantics are as follows:
  num_library_samples: Indicates the number of the samples in the video data 2 pointed to by this group.
  library_sample_index: Indicates the identifier of the sample entry of the video data 2 pointed to by this group.
  The track, to which the sample entries pointed to by library_sample_index belong, is described by the 'tref' data box of the current track. In another case, the samples in video data 2 are described in two or more tracks. At this time, in order to locate the samples in video data 2 pointed to by the sample group, the following syntax is required:

```
class LibrarySampleGroupEntry extend
VisualSampleGroupEntry ('libg'){
    unsigned int (32) num_library_samples;
    for( i=0; i<num_library_samples; i++) {
        unsigned int (32) library_track_ID;
        unsigned int (32) library_sample_index;
    }
}
```

The corresponding semantics are as follows:
  num_library_samples: Indicates the number of the samples in the video data 2 pointed to by this group.
  library_track_ID: Indicates the track ID of the sample entries of the video data 2 pointed to by this group.
  library_sample_index: Indicates the identifier of the sample entry of the video data 2 pointed to by this group. According to the track ID to which the sample entry of the samples in the video data 2 belongs, the dependent sample in video data 2 can be uniquely determined, so as to establish the dependency between the sample in video data 1 and the sample in video data 2.

Figure 20:
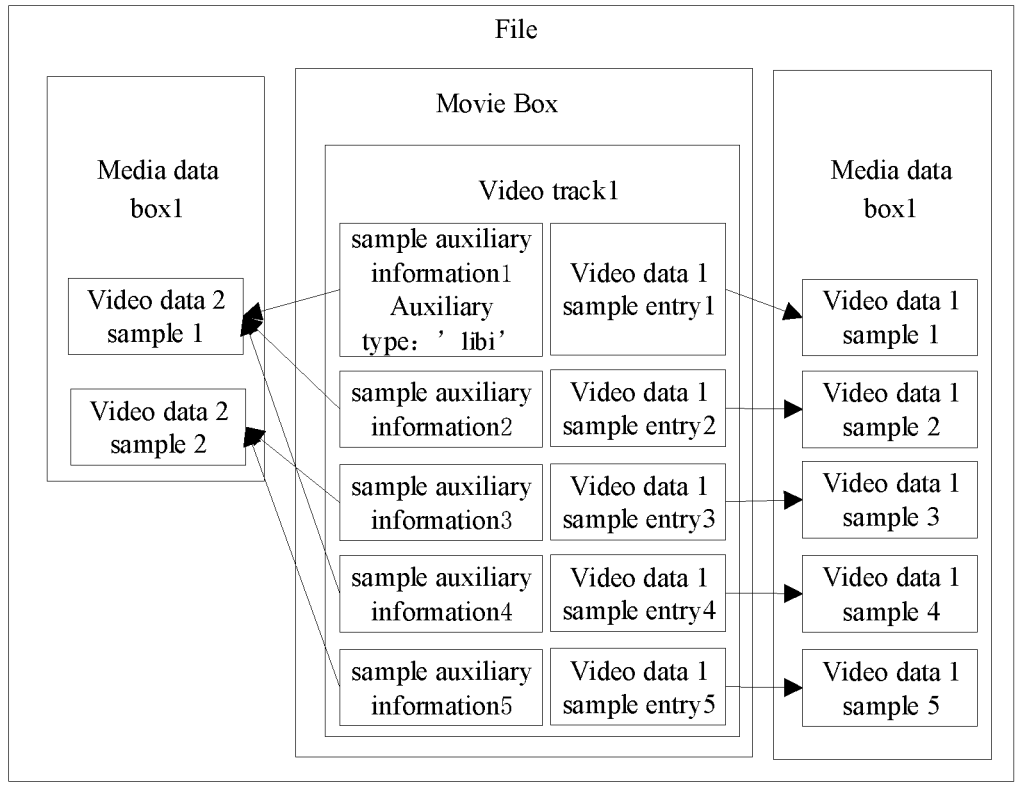
FIG. 20 The example of an embodiment provided by this invention to produce media data.

Exemplary Embodiment 58: FIG. 20 shows another exemplary embodiment of the method to produce media data. In this exemplary embodiment, the media data box and the 'Movie Box' (metadata box) are stored in one file. In another case, the media data box and the Movie Box are stored in different files. In order to describe the dependency relation between the video data 1 and the video data 2, a track is used in the metadata to describe the video data 1 and its sample auxiliary information. As shown in FIG. 20, in the video track, the sample auxiliary information (Sample auxiliary information sizes box and sample auxiliary information offsets box) is used to describe the dependency relation between the video data 1 and the video data 2, and the sample auxiliary information and the video data 1 sample entry are one-to-one corresponded in temporal domain. In order to describe the location of the sample in video data 2 on which the sample in video data 1 depends, wherein the sample in video data 1 corresponds to the video data 1 sample entry, it is necessary to add a new value to the information type (aux_info_type) of the sample auxiliary information, e.g. value 'libi' is used. When the value of the information type is 'libi', it means that the current data box is sample auxiliary information, which includes reference relation between the video data 2 and the video data 1, as well as the location of the video data 2 in the media data box.

Since the sample auxiliary information and the video data 1 sample entry are one-to-one corresponded in temporal domain, when the 'libi' type is detected in a box of sample auxiliary information, the location of the library layer data, referenced by the corresponding video layer data, in the media data of the video layer data can be obtained for the sample entry of sample in video data 1, which corresponding to the said box. Therefore, in this exemplary embodiment, the library layer data and the video layer data must be in the same file.

Figure 21:
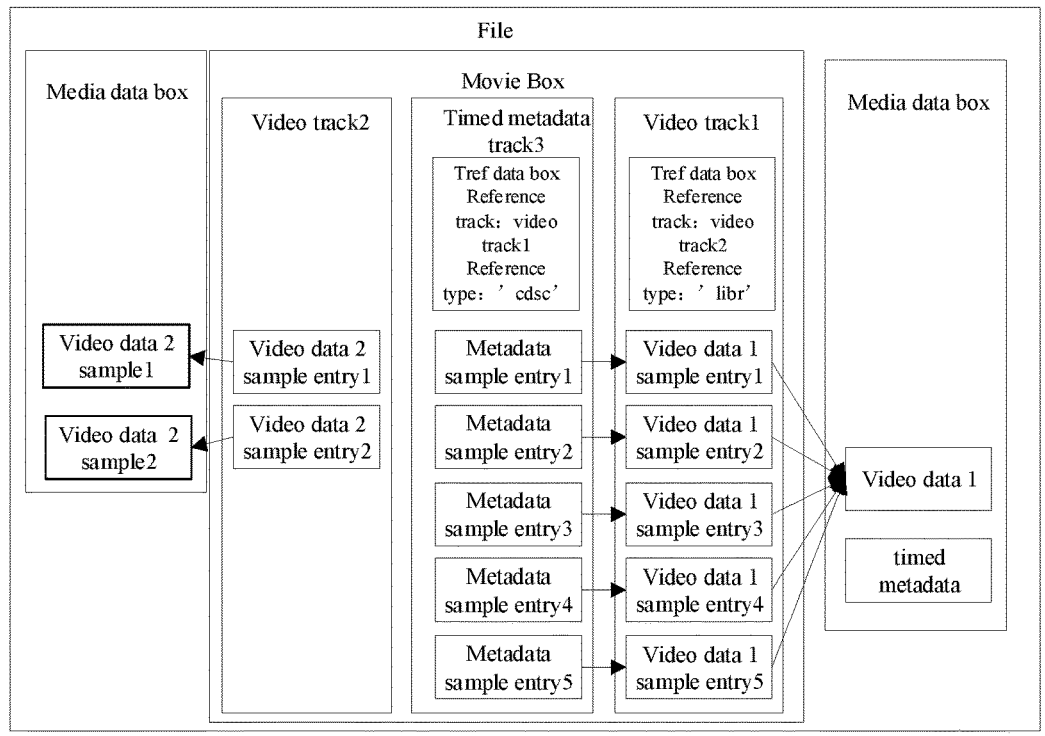
FIG. 21 The example of an embodiment provided by this invention to produce media data.
Figure 22:
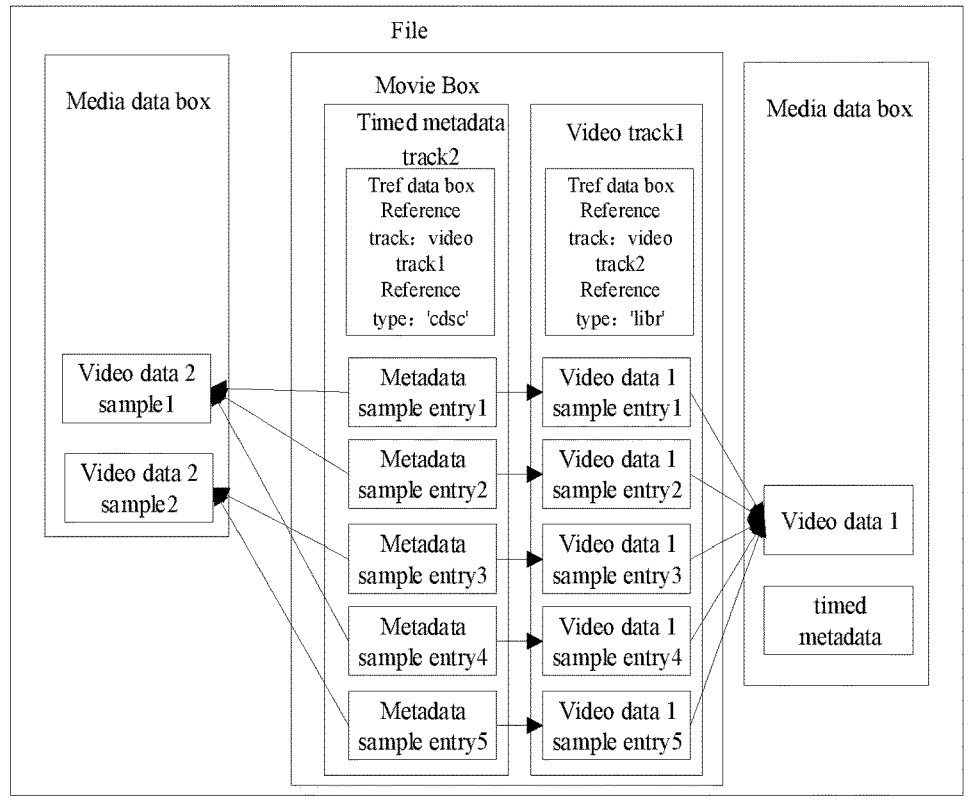
FIG. 22 The example of an embodiment provided by this invention to produce media data.

Exemplary Embodiment 59: FIG. 21 shows another exemplary embodiment of the method to produce media data. In this exemplary embodiment, the media data box and the 'Movie Box' (metadata box) are stored in one file. In another case, the media data box and the 'Movie Box' are stored in different files. In order to describe the dependency relation between video data 1 and video data 2, two tracks are used in the metadata to describe the samples in video data 1 and the samples in video data 2 respectively, and a timed metadata track is used to describe the dependency relation between the video tracks. As shown in FIG. 22, video track 1 describes the structure of the samples in video data 1, video track 2 describes the structure of the samples in video data 2, and video track 3 describes the structure of timed metadata samples. In video track 1 and video track 3, a 'tref' data box (Track Reference Box) is used to describe the dependency relation between video track 1 and video track 3. In order to mark the dependency relation between the track 1 and track 2 is the same as the dependency relation between the video data 1 and the video data 2, it is necessary to add a new value to the reference type (reference type) of the 'tref' data box, for example, value 'libr' is used. When the value of the reference type is 'libr', it means that this is a special reference type, that is, the data sample pointed to by the current video track 1 depends on the data sample pointed to by the video track 2 which is identified by the track identifier in the 'tref' box.

Since the sample in video data 1 and the timed metadata sample use the same numeration principle, the sample in video data 1 and the timed metadata sample both use the temporal order, and the dependency relation between the samples can be directly described by the time stamp. At the same time, the timed metadata sample pointed to by the timed metadata sample entry describes the dependency between the sample in video data 1 pointed to by the sample entry in the track of video data 1 and the sample in video data 2 pointed to by the sample entry in the track of video data 2. Therefore, it is necessary to add a sample syntax in the timed metadata to describe the dependency relation:

```
class LibraryMetadataSample {
    referenceLibarySampleInfo( );
}
aligned(8) class referenceLibarySampleInfo extends Box('refl') {
    unsigned int(8) number_of_library_sample;
    for (i = 0; i <number_of_library_sample; i++)
        unsigned int(32) library_sample_index;
}
```

The corresponding semantics are as follows:
  number_of_library_sample: indicates the number of referenced samples in the video data 2.
  library_sample_index: indicates the number of the sample entries in the video data 2. Wherein, the track, to which the sample entries pointed to by library_sample_index belong, is described by the 'tref' data box of the track of the video data 1.

Another exemplary embodiment provides a method to produce media data: different from the Exemplary Embodiment 59, the segment index box is used to describe the dependency relation between the sample in video data 1 and the sample in video data 2, the syntax of the segment index data box is:

```
Aligned(8) class SegmentIndexBox extends FullBox('sidx', version, 0) {
   unsigned int(32) reference_ID;
   unsigned int(32) timescale;
   if(version==0){
           unsigned int(32) earliest_presentation_time;
           unsigned int(32) first_offset;
   }
   else {
        unsigned int(64) earliest_presentation_time;
        unsigned int(64) first_offset;
   }
   unsigned int(16) reserved = 0;
   unsigned int(16) reference_count;
   for (i=1 ; i <= reference_count; i++)
   {
      bit(1) reference_type;
      unsigned int(31) reference_size;
      unsigned int(32) subsegment_duration;
      bit(1) starts_with_SAP;
      unsigned int(3) SAP_type;
      unsigned int(28) SAP_delta_time;
   }
   for (i=1 ; i <= reference_count; i++)
   {
      bit(1) reference_library_flag;
      bit(31) reference_sample_number;
        for (j=1 ; i <= reference_sample_number; i++)
        {
          unsigned int(32) sample_track_ID;
          unsigned int(32) sample_ID;
        }
   }
}
```

The syntax elements in italics are newly added in the box, and their semantics are:

reference_library_flag: a value of 1 means that the current item references to the library picture, and a value of 0 means the current item does not reference to the library picture;

reference_sample_number: indicates the number of library pictures referenced to by the current item;

sample_track_ID: indicates the track ID of the track corresponding to the sample of the library picture being referenced to by the current item;

sample_ID: indicates the number of the samples of the library picture being referenced to by the current item;

Exemplary Embodiment 60: FIG. 22 shows another exemplary embodiment of the method to produce media data. Compared with the Exemplary Embodiment 59, the sample syntax of the timed metadata describing the dependency relation is as follows:

```
class LibraryMetadataSample {
referenceLibarySampleInfo( );
}
aligned(8) class referenceLibarySampleInfo extends Box('refl') {
   unsigned int(8) number_of_library_sample;
   for (i = 0; i <number_of_library_sample; i++) {
     String library_sample_URL;
     unsigned int(32) library_sample_offset;
     unsigned int(32) library_sample_size;
   }
}
```

The corresponding semantics are as follows:

number_of_library_sample: indicates the number of referenced samples in the video data 2.

library_sample_URL: indicates the Uniform Resource Locator of the sample in the video data 2.

library_sample_offset: indicates the byte offset of the sample in the video data 2.

library_sample_size: indicates the byte size of the sample in the video data 2.

Figure 23:
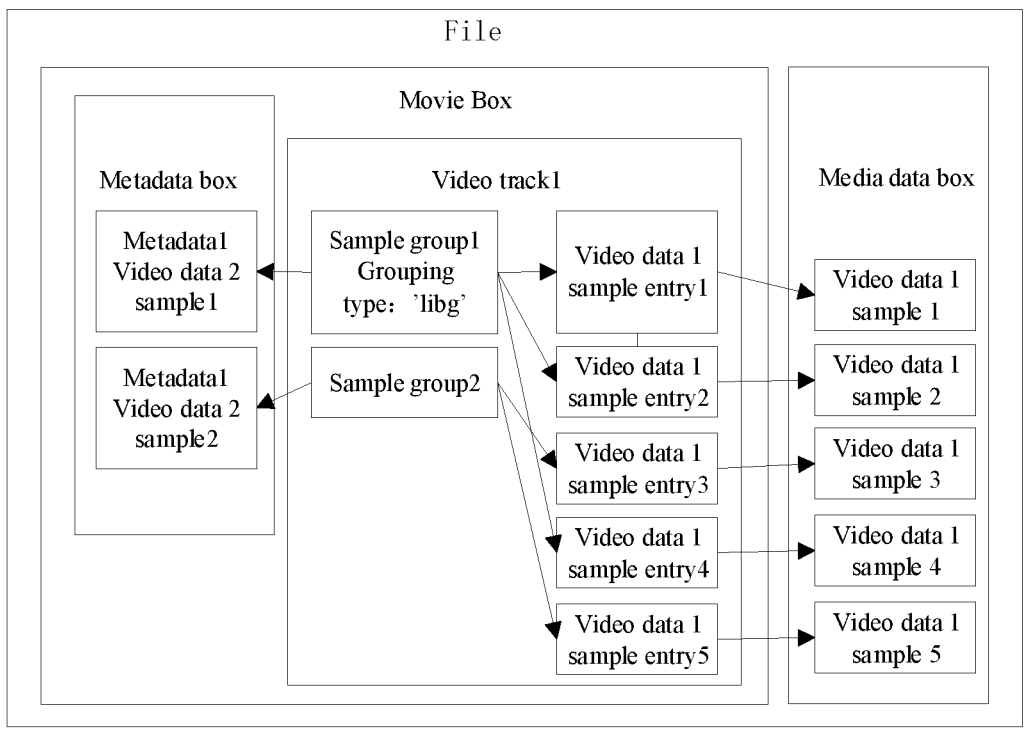
FIG. 23 The example of an embodiment provided by this invention to produce media data.

Exemplary Embodiment 61: FIG. 23 shows another exemplary embodiment of the method to produce media data. In this exemplary embodiment, the media data box and the 'Movie Box' (metadata box) are stored in one file. In another case, the media data box and the 'Movie Box' may be stored in different files. In order to describe the dependency relation between the video data 1 and the video data 2, in the video track, a sample group is used to describe the dependency relation between the video data 1 and the video data 2. In order to describe the location of the sample in video data 2 in the metadata box, wherein the said sample in video data 2 is depended on by the sample in video data 1 corresponding to the sample entry of the sample in video data 1, it is necessary to add a new value to the grouping_type of the sample group, for example, value 'libg' is used. When the value of the grouping_type is 'libg', it means that the current data box is a sample group carrying dependency relation, which contains the dependency relation between the video data 2 and the corresponding video data 1 and the location of the video data 2 in the metadata box. The syntax of the sample group is as follows:

```
class sampleToLibraryItemEntry extends
SampleGroupDescriptionEntry('libg') {
   unsigned int(32) meta_box_handler_type;
   unsigned int(32) num_items;
   for(i = 0; i <num_items; i++) {
     unsigned int(32) item_id[i];
     unsigned int(32) library_pid[i];
   }
}
```

Figure 24:
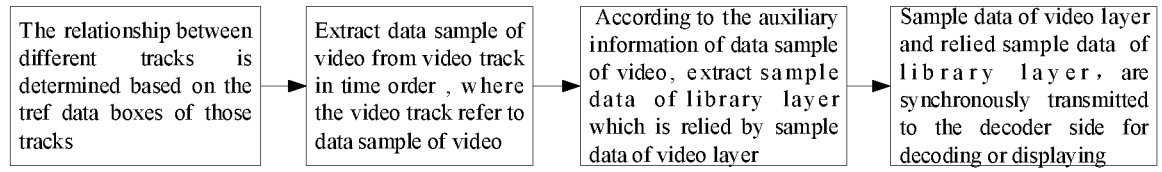
FIG. 24 The example of an embodiment provided by this invention for media data transmitting.

The semantics of the syntax elements are:

meta_box_handler_type: the type of the metadata item, where the value 'libi' is added to indicate that the type of the metadata item is library picture;

num_items: the number of metadata items;

item_id[i]: the identifier of the i-th metadata item;

library_pid[i]: the identifier of the library picture corresponding to the i-th metadata item. Exemplary Embodiment 62 provides a method of transmitting media data, FIG. 24 presents an example. First, the relation between different tracks is determined based on the 'tref' data boxes of those tracks, with which video track 1 referred to data sample of video 1, video track 2 referred to data sample of video 2 (if existed), metadata track 3 referred to timed metadata sample (if existed) are determined. Then data sample of video 1 is extracted from video track 1 in temporal order. Then according to auxiliary information of data sample of video 1, data sample of video 2 is located and extracted which is relied by sample data of video 1, where description method of auxiliary information could be any kind of methods describing dependency relation between sample data of video 1 and sample data of video 2 that are mentioned in Exemplary Embodiments corresponding to FIG. 19~22. After that, sample data of video 1 and relied sample data of video 2 are synchronously transmitted to the decoder side for decoding or displaying.

Figure 25:
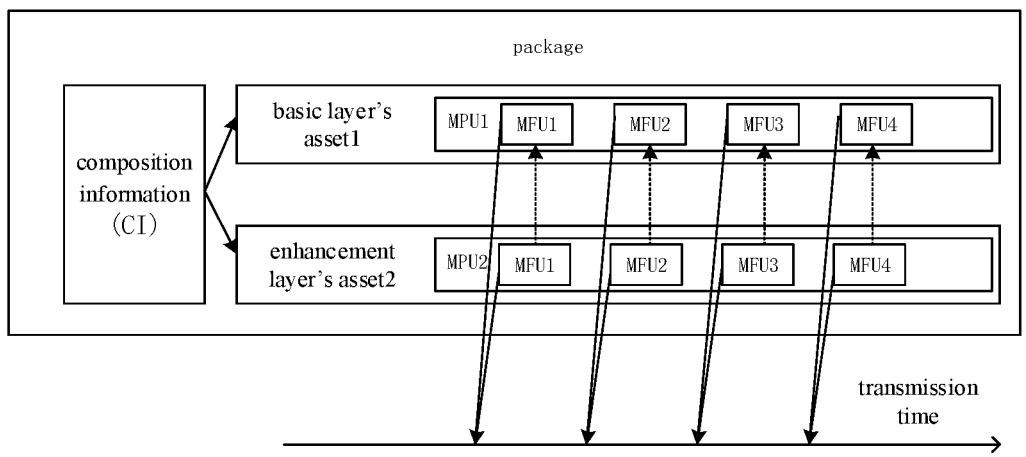
FIG. 25 The example of an embodiment provided by this invention for media data transmitting.
Figure 26:
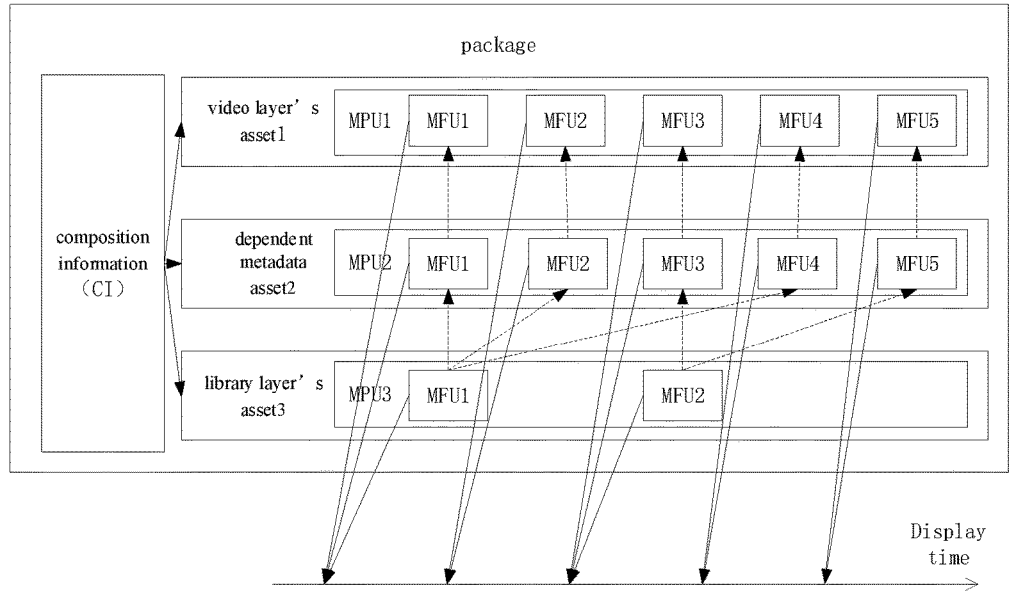
FIG. 26 The example of an embodiment provided by this invention for media data transmitting.

Exemplary Embodiment 63 provides a method of transmitting media data, FIG. 25 presents an example for transmitting SVC media data. SVC media data is packed into a package. The package contains two assets—asset1 and asset2, and a composition information (CI). Each asset contains an MPU, where each MPU contains a kind of data of SVC media data, such as asset1's MPU1 contains basic layer's data, and asset2's MPU2 contains enhancement layer's data. CI records information such as dependency relation between assets, such as CI describes dependency of asset1 to asset2. Each MPU contains at least one MFU, and hint track describes segment information of MFU within MPU, such as MPU2 is segmented into MFU1-4, and MPU2 is segmented into MFU1-4. And dash line represents dependency relation between MFUs, such as MFU1-4 of asset1 relatively depends on MFU1-4 of asset2. Meanwhile, since basic layer's data and enhancement layer's data are all time-aligned media data, MFUs that dependent on each other need to be transmitted synchronously at client side, such as solid arrow in FIG. 25 describes MFU's transmission time in time line. It should be noticed that when using MMT to transmit SVC media data, SVC media data is simply segmented and transmitted according to the same aligned time period, which is not viable when transmitting media data with non-aligned time dependency relation based on simple segment transmission.

Exemplary Embodiment 64 provides a method of transmitting media data, FIG. 25 presents an example for segmenting and transmitting media data. Different from Exemplary Embodiment 63, the Exemplary Embodiment uses different method to describe dependency relation between MFUs. The Exemplary Embodiment packs library-based coded media data into a package. The package contains three assets—asset1, asset2 and asset3, and a CI. Each asset contains one MPU, and each MPU contains a kind of data of library-based coded media data, such as asset1's MPU contains data of video layer, asset2's MPU2 contains dependent metadata, and asset3's MPU3 contains data of library layer. CI records information such as temporal information, temporal information and dependency information between assets, such as CI records dependency of asset1 on asset2, and dependency of asset2 on asset3. Each MPU contains at least one MFU, and hint track describes segmentation information of MFU in MPU, such as MPU1 is segmented into MFU1-5, and MPU2 is segmented into MFU1-5 and MPU3 is segmented into MFU1-2. Dash line represents dependency information between MFUs, such as MFU1-5 of asset1 depends on MFU1-5 of asset2 respectively, and MFU1-5 of asset2 depend on MFU1 of asset3, MFU3 and MFU5 of asset2 depend on MFU2 of asset 3. Different form previous Exemplary Embodiments, the Exemplary Embodiment describes dependency relation between MFUs using timed metadata. The timed metadata has the same non-aligned time period of video layer's data, and timed metadata and video layer's data is synchronized by aligning time period. Meanwhile, timed metadata describes library layer's data that is needed by synchronization of aligned time period, which makes video layer's data correlates to library layer's data indirectly. The advantage of this method is addition and deletion of timed metadata track is flexible, with no change of video layer's data. But disadvantage of the method is timed metadata is restored in file's media data, MMT sender firstly needs to locate timed metadata based on hint example and then parse timed metadata to finally extract dependent library layers' data from file, which brings additional operating burden to MMT sender. Syntax of needed timed metadata that describes dependent relation is given as:

```
aligned(8) class MMTHDepMetaDataSample extend MMTHSample {
  dependencyMetaDataInfo( );
}
aligned(8) class dependencyMetaDataInfo extends Box('dmet') {
  bit(1) reference_MFU_flag;
  bit(7) reserved0;
  if (reference_MFU_flag) {
    unsigned int(8) number_of_reference_MFU;
    for (i = 0; i <number_of_reference_MFU; i++) {
      unsigned int(32) depended_MFU_asset_id;
      unsigned int(32) depended_MFU_sequence_number;
    }
  }
}
```

The semantics of those syntaxes are:
reference_MFU_flag: indicating whether referencing to MFU, a value of '0' indicates not referencing.
number_of_reference_MFU: indicating the number of referenced MFU.
depended_MFU_asset_id: indicating the asset number of referenced MFU that belongs to.
depended_MFU_sequence_number: indicating the number of referenced MFU.

Under another condition, the Syntaxes are:

```
aligned(8) class MMTHDepMetaDataSample extend MMTHSample {
  dependency MetaDataInfo( );
}
aligned(8) class dependencyMetaDataInfo extends Box('dmet') {
  bit(1) reference_sample_flag;
  bit(7) reserved0;
  if (reference_sample_flag) {
    unsigned int(8) number_of_reference_sample;
    for (i = 0; i <number_of_reference_sample; i++) {
      unsigned int(32) depended_sample_MPU_id;
      unsigned int(32) depended_sample_id;
    }
  }
}
```

The semantics of those syntaxes are:
reference_sample_flag: indicating whether referencing to MFU, a value of '0' indicates not referencing to.
number_of_reference_sample: indicating the number of referenced MFU.
depended_sample_MPU_id: indicating the asset number of referenced MFU that belongs to.
depended_sample_id: indicating the number of referenced MFU.

Figure 27:
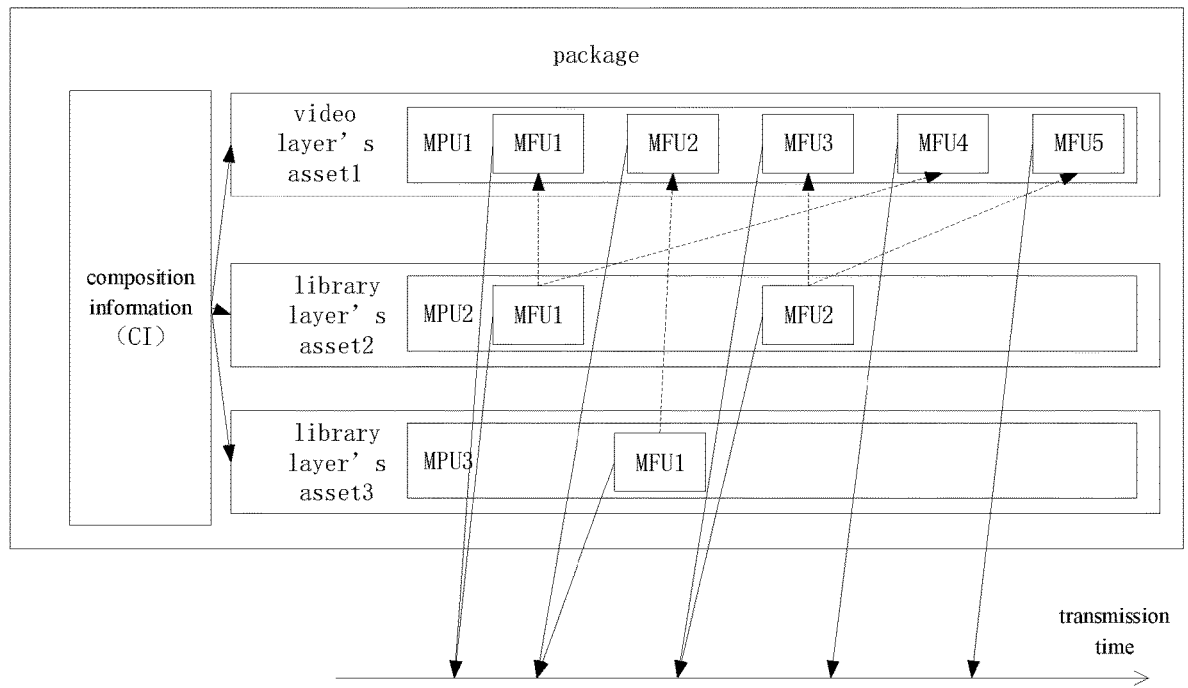
FIG. 27 The example of an embodiment provided by this invention for media data transmitting.

Exemplary Embodiment 65 provides a method of transmitting media data, FIG. 27 presents an example for segmenting and transmitting media data. Different from Exemplary Embodiment 64, the Exemplary Embodiment uses different method to describe dependency relation between MFUS. The Exemplary Embodiment packs library-based coded media data into a package. The package contains three assets—asset1, asset2 and asset3, and a CI. Each asset contains one MPU, and each MPU contains a kind of data of library-based coded media data, such as asset1's MPU contains data of video layer, library layer's data is segmented into two or more assets, such as asset2's MPU2 contains data of library layer, and asset3's MPU3 contains data of library layer. CI records information such as temporal information, temporal information and dependency information between assets, such as CI records dependency of asset1 on asset2 and asset3, and asset2 and asset3 could be independent or dependent on each other. Each MPU contains at least one MFU, and hint track describes segmentation information of MFU in MPU, such as MPU1 is segmented into MFU1-5, and MPU2 is segmented into MFU1-2 and MPU3 is segmented into MFU1. Dash line represents dependency information between MFUS, such as MFU1 and MFU5 of asset1 depends on MFU1 of asset2, and MFU2 of asset1 depends on MFU1 of asset3, MFU3 and MFU5 of asset1 depend on MFU2 of asset 2. Because the number of MFU of asset2 and asset3 may coincide, location information of MFU needs to be added. Meanwhile, dependent MFUS dependent on each other need to be transmitted synchronously at client side, such as solid arrow in FIG. 25 describes MFU's transmission time in time line. Since video layer's data is temporally aligned media data, and library layer's data is non-aligned media data, dependency relation between MFUs should be marked. The advantage of this method is MMT sender obtains dependency relation between video layer's data and library layer's data by analyzing hint track of video layer's data, and then extract video layer's MFU and library layer's MFU based on hint track of video layer's data and library layer's data. In addition, the method does not change hint track of library layer's data, because of which the dependency and flexibility of library layer's data is kept. The disadvantage of the method is number of MFUs of different assets may coincide, causing hint sample of video layer's data may use redundant library layer's data to locate information. Based on MMT standard MFU sample, extended description of depended MFU (DMFU) sample of current MFU sample and added location information for locating MFU sample is given as syntax table in the following:

```
aligned(8) class MMTHRefSample extend MMTHSample {
referenceMFUInfo( );
}
aligned(8) class referenceMFUInfo extends Box('refm') {
bit(1) referenceMFU_flag;
bit(7) reserved0;
    if (referenceMFU _flag) {
        unsigned int(8) number_of_depended_MFU;
        for (i = 0; i <number_of_depended_MFU; i++)
            unsigned int(32) depended_MFU_asset_id;
            unsigned int(32) depended_MFU_sequence_number;
    }
}
```

The semantics of those syntaxes are:
referenceMFU_flag: indicating whether referencing to MFU, a value of '0' indicates not referencing to.
number_of_depended_MFU: indicating the number of referenced MFU.
depended_MFU_asset_id: indicating the asset number of referenced MFU that belongs to.
depended_MFU_sequence_number: indicating the number of referenced MFU.

Figure 28:
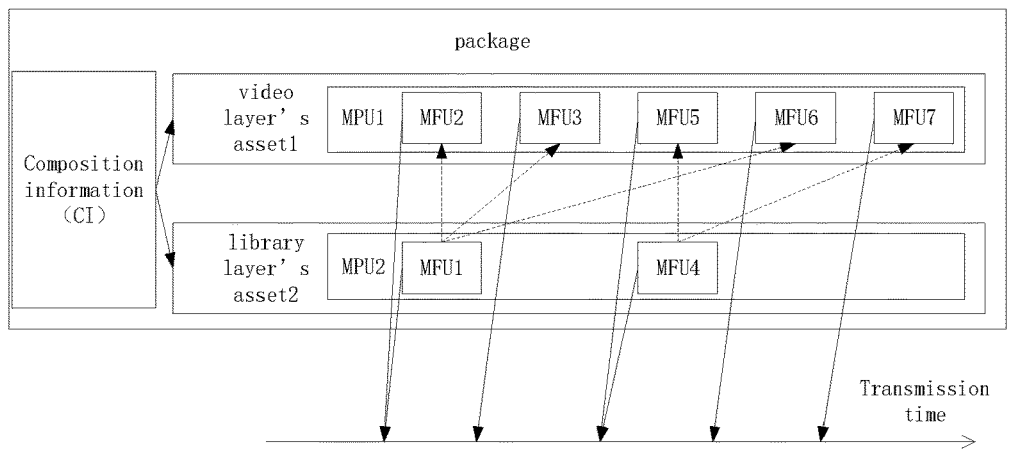
FIG. 28 The example of an embodiment provided by this invention for media data transmitting.

Exemplary Embodiment 66: FIG. 28 provides a method of transmitting media data. Different from Exemplary Embodiment 64 and 65, the Exemplary Embodiment uses different method to describe dependency relation between MFUs. The Exemplary Embodiment packs library-based coded media data into a package. The package contains two assets—asset1 and asset2, and a CI. Each asset contains one MPU, and each MPU contains a kind of data of library-based coded media data, such as asset1's MPU contains data of video layer, and asset2's MPU2 contains data of library layer. CI records information such as temporal information, temporal information and dependency information between assets, such as CI records dependency of asset1 on asset2. Each MPU contains at least one MFU, and hint track describes segmentation information of MFU in MPU, such as MPU2 is segmented into MFU1 and MFU4, and MPU1 is segmented into MFU2, MFU3 and MFU5-7. And dash line represents dependency relation between MFUs, such as MFU2, MFU3 and MFU6 of asset1 depend on MFU1 of asset2, MFU5 and MFU7 of asset1 depend on MFU4 of asset2. MFUs that dependent on each other need to be transmitted synchronously at client side, such as solid arrow in FIG. 28 describes MFU's transmission time in time line. Since video layer's data is temporally aligned media data, and library layer's data is non-aligned media data, dependency relation between MFUs should be marked. The advantage of this method is MMT sender obtains dependency relation between video layer's data and library layer's data by analyzing hint track of video layer's data, and then extract video layer's MFU and library layer's MFU based on hint track of video layer's data and library layer's data. In addition, the method does not change hint track of library layer's data, because of which the dependency and flexibility of library layer's data is kept. Based on MMT standard MFU sample, extended description of depended MFU (DMFU) sample of current MFU sample is given as syntax table in the following:

```
aligned(8) class MMTHRefSample extend MMTHSample {
referenceMFUInfo( );
}
aligned(8) class referenceMFUInfo extends Box('refm') {
bit(1) referenceMFU_flag;
bit(7) reserved0;
    if (referenceMFU_flag) {
        unsigned int(8) number_of_depended_MFU;
        for (i = 0; i <number_of_depended_MFU; i++)
            unsigned int(32) depended_MFU_sequence_number;
    }
}
```

The semantics of those syntaxes are:
referenceMFU_flag: indicating whether referencing MFU, a value of '0' indicates not referencing to.
number_of_depended_MFU: indicating the number of referenced MFU.
depended_MFU_sequence_number: indicating the number of referenced MFU.

Above syntaxes describe DMFU depended by MFU. In a similar way, reference MFU (RMFU) dependent on current MFU could be describe such as:

```
aligned(8) class MMTHDepSample extend MMTHSample {
dependedMFUInfo( );
}
aligned(8) class dependedMFUInfo extends Box('depm') {
bit(1) dependedMFU_flag;
bit(7) reserved0;
    if (dependedMFU_flag) {
        unsigned int(8) number_of_reference_MFU;
        for (i = 0; i <number_of_reference_MFU; i++) {
            unsigned int(32) reference_MFU_sequence_number;
            unsigned int(32) number_of_consequent_MFU;
        }
    }
}
```

The semantics of those syntaxes are:
dependedMFU_flag: indicating whether referencing MFU, a value of '0' indicates not referencing to.
number_of_reference_MFU: indicating the number of referenced MFU.
reference_MFU_sequence_number: indicating the number of referenced MFU.
number of consequent MFU: indicating the number of consecutive MFUs depending on current MFU after RMFU.

Dependency relation between MFUs is obtained from above syntaxes. It should be noticed that under one condition, the number of DMFU and RMFU use the same group of numeration principle and are not coincided with each other, when DMFU and RMFU can be determined distinctively. Under the other condition, the number of DMFU and RMFU use different group of numeration principle with current MFU and could coincide with each other, dependency information between assets belonging to MPUs belonging to MFUs described by CI is needed to determine the asset belonging to MPUs belonging to DMFU and RMFU, in which way DMFU and RMFU are determined distinctively.

Figure 29:
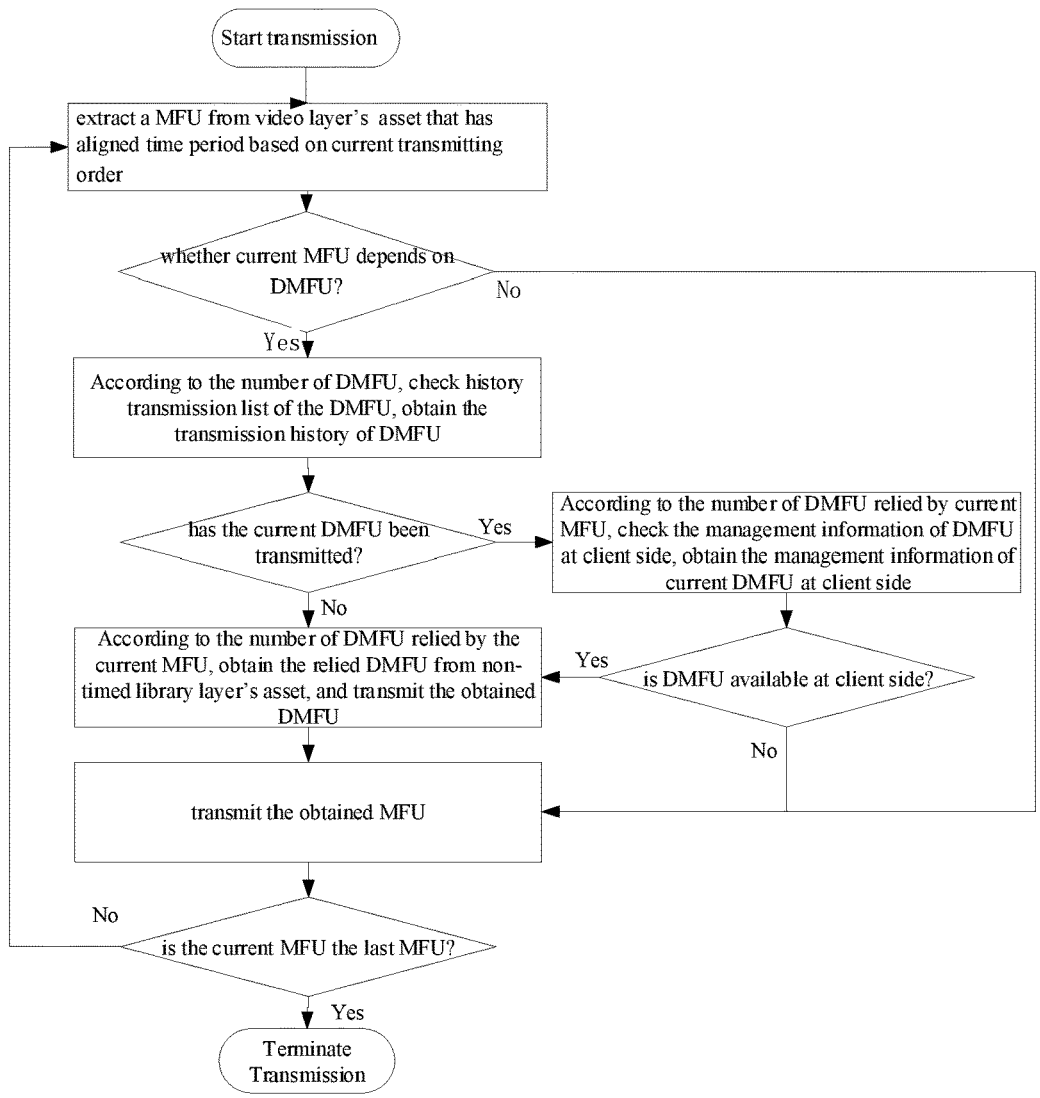
FIG. 29 The example of an embodiment provided by this invention for media data transmitting.

Exemplary Embodiment 67 provides a method of transmitting media data, FIG. 29 presents an example for transmitting media data. Different from Exemplary Embodiment 64, 65 and 66, the Exemplary Embodiment add the operation of avoiding MFU repeat transmission. After determining dependency relation between MFUs and MFUs are determined distinctively, when MFUs are needed to be transmitted, dependent MFUs should be transmitted synchronously according to dependency relation. FIG. 29 describes flowchart of transmitting MFUs, firstly extract current MFU from video layer's data of asset1 that has aligned time period based on current transmitting order, such as MFU2 of asset1. Based on sample information of current MFU, decide whether current MFU depends on DMFU. If current MFU does not depend on DMFU, then transmit current MFU and obtain the next MFU in order or terminate transmission. If current MFU depends on DMFU, then obtain the DMFU from library layer's data of asset2 which has non-aligned time period based on the number of DMFU described by current MFU. Because multiple aligned MFUs depend on the same non-aligned MFU, to avoid repeat transmission of DMFU, 3 conditions should be considered to decide the availability of DMFU at client side when transmitting DMFU, as shown in FIG. 29. Under one condition, based on history transmission list of DMFU, if the DMFU depended by current MFU is not transmitted, then DMFU and current MFU need to be transmitted synchronously, such as depended MFU1 of asset2 and MFU2 of asset2 should be transmitted synchronously. Under anther condition, based on history transmission list of DMFU, if the DMFU depended by current MFU is already transmitted, then only current MFU is needed to transmitted, such as in FIG. 28 MFU3, MFU6, MFU7 of asset2, MFU3 and MFU6 referenced MFU1 of asset2 is already transmitted synchronously with MFU2 of asset1, MFU7 referenced MFU4 of asset2 is already transmitted synchronously with MFU5 of asset1. Under another condition, based on history transmission list of DMFU, if the DMFU depended by current MFU is already transmitted, while the DMFU is not available at client side informed by token information from client side because of several possible reasons such as utilization frequency, restoring and management method, DMFU and current MFU need to be transmitted synchronously, such as client side can only restore one MFU of asset2, when transmitting MFU5 of asset1, MFU4 of asset2 transmitted synchronously replaces existed MFU1 of asset2, causing unavailability of MFU1 of asset2. Therefore, when transmitting MFU6 of asset1, MFU1 of asset2 needs to be transmitted once again.

Exemplary Embodiment 68 provides a method of transmitting media data. To understand and model management results of non-aligned library layer's data at client side, token information is needed during transmission.

Under one condition, server side inform client side using token information about information such as the optimal buffer size, buffer managing methods (possible buffer managing methods such as FIFO, LFU and LRU) of non-aligned library layer's data, which needs library buffer model (LBM) information, related syntaxes are defined at below:

| Syntax | Values | No. of bits | Mnemonic |
| --- | --- | --- | --- |
| LBM_message( ) { | | | |
| message_id | | 16 | unsigned short |
| version | | 8 | unsigned char |
| length | | 16 | unsigned short |
| payload{ | | | |
| required_buffer_size | | 32 | unsigned integer |
| required_buffer_Manage | | 8 | unsigned short |
| } | | | |
| } | | | |

The semantics of those syntaxes are:
message_id: indicating current information is LBM information;
version: indicating version of LBM information, client side can check whether LBM information is an old or a new information;
length: indicating byte length of LBM information;
required_buffer_size: indicating to the client side that for accepting data, the needed bytes for restoring library layer's buffered data
required_buffer_Manage: indicating to the client side the method of managing library data buffer, such as a value of '0' indicates using FIFO, a value of '1' indicates using LFU, and a value of '2' indicates using LRU.

Under another condition, client side feedbacks managing method of library layer's data buffer to server side with token information, informing what library layer's data that is already transmitted is not available at client side. In this way, when server side transmits video layer's data that depends on unavailable library layer's data, unavailable library layer's data can be transmitted again. This requires library layer's data buffer feedbacks information, syntaxes are defined in the following:

| Syntax | Values | No. of bits | Mnemonic |
| --- | --- | --- | --- |
| LBM feedback_message( ) { | | | |
| message_id | | 16 | unsigned short |
| version | | 8 | unsigned char |
| length | | 16 | unsigned short |
| payload{ | | | |
| unavailable_mfu_number | N | 32 | unsigned integer |
| for(i=0;i<N;i++){ | | | |
| asset_id | | 32 | unsigned integer |
| sample_id | | 32 | unsigned integer |
| mfu_id | | 32 | unsigned integer |
| } | | | |
| } | | | |
| } | | | |

The semantics of those syntaxes are:
message_id: indicating current information is LBM information;
version: indicating version of LBM information, client side can check whether LBM information is an old or a new information;
length: indicating byte length of LBM information;
unavailable_mfu_number: indicating the number of MFU belonging to unavailable data in library layer's data buffer;

asset_id: indicating the number of assets of i-th unavailable MFU;

sample_id: indicating the number of samples of i-th unavailable MFU;

mfu_id: indicating the number of i-th unavailable MFU.

Exemplary Embodiment 69 adds a new type of relation, such as in Smart Media Transport (SMT), original relations are dependency relation, composition relation, equivalence relation and similarity relation, and corresponding flags are dependency_flag, composition_flag, equivalence_flag and similarity_flag. The new type of relation added in this Exemplary Embodiment is non-aligned library dependency relation, the corresponding flag is library_flag, which is used to describe the dependency relation between current asset and non-aligned library asset, related syntax table is defined at below.

| Syntax | Values | No. of bits | Mnemonic |
|---|---|---|---|
| Asset_group_descriptor( ) { | | | |
| descriptor_tag | | 16 | uimsbf |
| descriptor_length | | 16 | uimsbf |
| reserved | '1111' | 4 | |
| dependency_flag | | 1 | blsbf |
| composition_flag | | 1 | blsbf |
| equivalence_flag | | 1 | blsbf |
| similarity_flag | | 1 | blsbf |
| library_flag | | 1 | blsbf |
| if(dependency_flag) | | | |
| { | | | |
| num_dependencies | | 8 | uimsbf |
| for(i = 0; i <N1; i++) { | N1 | | |
| asset_id( ) | | | |
| } | | | |
| } | | | |
| if(composition_flag) | | | |
| { | | | |
| num_compositions | | 8 | uimsbf |
| for(i = 0; i <N2; i++) { | N2 | | |
| asset_id( ) | | | |
| } | | | |
| } | | | |
| if(equivalence_flag) | | | |
| { | | | |
| equivalence_selection level | | 8 | uimsbf |
| num_equivalences | | 8 | uimsbf |
| for(i = 0; i <N3; i++) { | N3 | | |
| asset_id( ) | | | |
| equivalence_selection_level | | 8 | uimsbf |
| } | | | |
| } | | | |
| if(similarity_flag) | | | |
| { | | | |
| similarity_selection_level | | 8 | uimsbf |
| num_similarities | | 8 | uimsbf |
| for( i = 0; i <N4; i++) { | N4 | | |
| asset_id( ) | | | |
| similarity_selection_level | | 8 | uimsbf |
| } | | | |
| } | | | |
| if(library_flag) | | | |
| { | | | |
| num_libraries | | 8 | uimsbf |
| for(i = 0; i <N5; i++) { | N5 | | |
| asset_id( ) | | | |
| } | | | |
| } | | | |
| } | | | |

The semantics of those syntaxes are:

descriptor_tag: indicating label value of this type of descriptor;

descriptor_length: indicating byte length of the descriptor, calculated from next field to the last field.

dependency_flag: indicating if it is needed to add dependency relation in the descriptor. A value of '0' indicates no need to add.

composition_flag: indicating if it is needed to add composition relation in the descriptor. A value of '0' indicates no need to add.

equivalence_flag: indicating if it is needed to add equivalence relation in the descriptor. A value of '0' indicates no need to add.

similarity_flag: indicating if it is needed to add similarity relation in the descriptor. A value of '0' indicates no need to add.

library_flag: indicating if it is needed to add non-aligned library dependency relation in the descriptor. A value of '0' indicates no need to add.

num_dependencies: indicating the number of depended assets of the described asset.

asset_id: indicating the asset ID of depended asset of described asset. The order of asset ID provided by the descriptor corresponds to internal coding dependency order.

num_compositions: indicating the number of assets that has composition relation with the described asset.

asset_id: indicating the asset ID of assets that has composition relation with the described asset.

equivalence_selection_level: indicating the displaying level of asset within equivalence group. A value of '0' indicates the described asset is displayed by default. When the default asset cannot be chosen, the asset that has smaller displaying level will be chosen and displayed.

num_equivalences: indicating the number of assets that has equivalence relation with the described asset.

asset_id: indicating the asset ID of assets that has equivalence relation with the described asset.

similarity_selection_level: indicating the displaying level of asset within similarity group. A value of '0' indicates the described asset is displayed by default. When the default asset cannot be chosen, the asset that has smaller displaying level will be chosen and displayed.

num_similarities: indicating the number of assets that has similarity relation with the described asset.

asset_id: indicating the asset ID of assets that has similarity relation with the described asset.

num_libraries: indicating the number of non-aligned library assets depended by the described asset.

asset_id: indicating the asset ID of non-aligned library assets that has dependency relation with the described asset.

An exemplary embodiment provides an apparatus to produce media data:

The first insert unit, which is used to put sample entry of the first media data in a first media track, wherein the first media data is timed media data, and the sample entry contains metadata pointing to sample of the first media data.

The second insert unit, which is used to put access unit entry of the second media data in a second media box, wherein the access unit entry contains metadata pointing to access unit of the second media data, and the second media data is timed or non-timed media data.

The third insert unit, which is used to mark two or more temporally-discontinuous samples in the first media data as a sample group, wherein the said samples meet one of the following requirements:

If the second media data is timed media data, the encoding or decoding of the said samples reference to the same group of access units in the second media data, wherein the same group of access units and at least one of the said two or more temporally-discontinuous samples are not temporally aligned;

If the second media data is non-timed media data, the encoding or decoding of the said samples reference to the same group of access units in the second media data.

Another exemplary embodiment provides an apparatus to produce media data:

The first insert unit, which is used to put sample entry of the first media data in a first media track, wherein the first media data is timed media data, and the sample entry contains metadata pointing to sample of the first media data.

The second insert unit, which is used to put access unit entry of the second media data in a second media box, wherein the access unit entry contains metadata pointing to access unit of the second media data, and the second media data is timed or non-timed media data.

The third insert unit, which is used to put dependency metadata for each sample respectively, wherein the sample is one of two or more temporally-discontinuous samples in the first media data and the said two or more temporally-discontinuous samples meet one of the following requirements:

If the second media data is timed media data, the dependency metadata corresponding to each sample contains index information that points to the same group of access units in the second media data, wherein the index information is any information other than the presentation time information of the sample of the first media data, and wherein the encoding or decoding of the said two or more temporally-discontinuous samples reference to the same group of access units, and wherein the same group of access units and at least one of the said two or more temporally-discontinuous samples are not temporally aligned.

If the second media data is non-timed media data, the dependency metadata corresponding to each sample includes index information that points to the same group of access units in the second media data, wherein the index information is any information other than the presentation time information of the sample of the first media data, and wherein the encoding or decoding of the said two or more temporally-discontinuous samples reference to the same group of access units.

An exemplary embodiment provides an apparatus of processing media data:

The first extract unit, which is used to extract the first media data and the second media data, wherein the first media data is timed media data, and the second media data is timed media data or non-timed media data.

The second extract unit, which is used to extract sample group from the track carrying the first media data, wherein the sample group contains two or more temporally-discontinuous samples.

The located unit, which is used to locate a group of access units in the second media data for each sample of the two or more temporally-discontinuous samples according to the description information in the sample group, wherein the index information of the group of access units is carried in the description information of the sample group, and wherein the second media data meets one of the following requirements:

(1) If the second media data is timed media data, the group of access units located by the two or more temporally-discontinuous samples are in the same group in the second media data, wherein the same group of access units is not aligned with the duration covered by at least one of the said samples of the first media data. Or (2) If the second media data is non-timed media data, the access units located by the two samples of the first media data are the same access unit in the second media data.

Another exemplary embodiment provides an apparatus of processing media data:

The first extract unit, which is used to extract the first media data and the second media data, where the first media data is timed media data, and the second media data is timed media data or non-timed media data;

The second extract unit, which is used to extract two or more temporally-discontinuous samples from the first media data.

The third extract unit, which is used to extract the dependency metadata from each sample of the two or more temporally-discontinuous samples.

The location unit, which is used to locate a group of access units in the second media data for each sample of the two or more temporally-discontinuous samples according to the dependency metadata, wherein the index information of the group of access units is carried by the dependency metadata, wherein the second media data meets one of the following requirements:

(1) If the second media data is timed media data, the access units in the second media data located by the two or more temporally-discontinuous samples are in the same group, wherein the same group of access units and at least one of the two or more temporally-discontinuous samples in the first media data are not temporally aligned.

(2) If the second media data is non-timed media data, the access units in the second media data located by the two or more temporally-discontinuous samples are the same access unit.

Another exemplary embodiment provides an apparatus of transmitting media data:

The first fragment unit: used to fragment the first media data into media fragment units (MFUs), where the first media data is timed media data and consists of two or more temporally discontinuous samples;

The first extraction unit: used to extract the dependent indexing information corresponding to the MFUs of first media data, where the dependent indexing information is the information except the displaying time information of MFUs' sample;

The first transmission unit: used to transmit the extracted MFUs of the first media data The location unit: uses the dependent indexing information corresponding to the MFUs of the first media data, and locate the second media data's access unit, where the second media data's access unit is referenced by encoding or decoding operation of the first media data sample belonging to the MFUs. The second media data meets one of the following requirements:

If the second media data is timed media data, the two or more temporally discontinuous samples of the first media data refer to the same second media data's access unit, and the time period of the second media data's access unit is not aligned with the time period of at least one sample of two or more temporally discontinuous samples of the first media data; or If the second media data is non-timed media data, the two samples of the first media data refer to the same second media data's access unit;

The searching unit: used to search the second media data's access unit in the hypothetical buffer;

The second fragment unit: when the second media data's access unit does not exist in the hypothetical buffer, it is used to fragment the second media data's access unit into media fragment units;

The second transmission unit: used to transmit the media fragment units of the second media data's access unit.

An exemplary embodiment provides an apparatus to produce media data:

Processer;

Memory; And

One or more programs are used to complete the following methods:

Processer puts sample entry of the first media data in a first media track, wherein the first media data is timed media data, and the sample entry contains metadata pointing to sample of the first media data.

Processer puts access unit entry of the second media data in a second media box, wherein the access unit entry contains metadata pointing to access unit of the second media data, and the second media data is timed or non-timed media data.

Processer puts dependency metadata for each sample respectively, wherein the sample is one of two or more temporally-discontinuous samples in the first media data and the said two or more temporally-discontinuous samples meet one of the following requirements:

If the second media data is timed media data, the dependency metadata corresponding to each sample contains index information that points to the same group of access units in the second media data, wherein the index information is any information other than the presentation time information of the sample of the first media data, and wherein the encoding or decoding of the said two or more temporally-discontinuous samples reference to the same group of access units, and wherein the same group of access units and at least one of the said two or more temporally-discontinuous samples are not temporally aligned.

If the second media data is non-timed media data, the dependency metadata corresponding to each sample includes index information that points to the same group of access units in the second media data, wherein the index information is any information other than the presentation time information of the sample of the first media data, and wherein the encoding or decoding of the said two or more temporally-discontinuous samples reference to the same group of access units.

The media data produced by the processor exists in the memory.

Another exemplary embodiment provides an apparatus to produce media data:

Processer;

Memory; And

One or more programs are used to complete the following methods:

Processer puts sample entry of the first media data in a first media track, wherein the first media data is timed media data, and the sample entry contains metadata pointing to sample of the first media data.

Processer puts access unit entry of the second media data in a second media box, wherein the access unit entry contains metadata pointing to access unit of the second media data, and the second media data is timed or non-timed media data.

Processer puts dependency metadata for each sample respectively, wherein the sample is one of two or more temporally-discontinuous samples in the first media data and the said two or more temporally-discontinuous samples meet one of the following requirements:

If the second media data is timed media data, the dependency metadata corresponding to each sample contains index information that points to the same group of access units in the second media data, wherein the index information is any information other than the presentation time information of the sample of the first media data, and wherein the encoding or decoding of the said two or more temporally-discontinuous samples reference to the same group of access units, and wherein the same group of access units and at least one of the said two or more temporally-discontinuous samples are not temporally aligned.

If the second media data is non-timed media data, the dependency metadata corresponding to each sample includes index information that points to the same group of access units in the second media data, wherein the index information is any information other than the presentation time information of the sample of the first media data, and wherein the encoding or decoding of the said two or more temporally-discontinuous samples refers to the same group of access units.

The media data produced by the processor exists in the memory.

An exemplary embodiment provides an apparatus of processing media data:

Processor;

Memory; And one or more programs are used to complete the following methods:

The processor processes the media data storing in the memory;

The processor extracts the first media data and the second media data, wherein the first media data is timed media data, and the second media data is timed media data or non-timed media data.

The processor extracts sample group from the track carrying the first media data, wherein the sample group contains two or more temporally-discontinuous samples.

According to the description information in the sample group, the processor locates a group of access units in the second media data for each sample of the two or more temporally-discontinuous samples, wherein the index information of the group of access units is carried in the description information of the sample group, and wherein the second media data meets one of the following requirements:

(1) If the second media data is timed media data, the group of access units located by the two or more temporally-discontinuous samples are in the same group in the second media data, wherein the same group of access units is not aligned with the duration covered by at least one of the said samples of the first media data. Or (2) If the second media data is non-timed media data, the access units located by the two samples of the first media data are the same access unit in the second media data.

Another exemplary embodiment provides an apparatus of processing media data:

Processer;

Memory;

One or more programs are used to complete the following methods:

Processer process the media data in the memory;

Processer extracts the first media data and the second media data, where the first media data is timed media data, and the second media data is timed media data or non-timed media data;

Processer extracts two or more temporally-discontinuous samples from the first media data.

Processer extracts the dependency metadata from each sample of the two or more temporally-discontinuous samples.

According to the dependency metadata, processer locates a group of access units in the second media data for each sample of the two or more temporally-discontinuous samples, wherein the index information of the group of access units is carried by the dependency metadata, and wherein the second media data meets one of the following requirements:

If the second media data is timed media data, the access units in the second media data located by the two or more temporally-discontinuous samples are in the same group, wherein the same group of access units and at least one of the two or more temporally-discontinuous samples in the first media data are not temporally aligned.

If the second media data is non-timed media data, the access units in the second media data located by the two or more temporally-discontinuous samples are the same access unit.

Another exemplary embodiment provides an apparatus of transmitting media data comprises:

Processor;

Memory;

Transmitter; and

One or more programs to accomplish the following methods:

Processor processes the existed media data in memory;

Processor fragments the first media data into media fragment units (MFUs), wherein the first media data is timed media data and consists of two or more temporally discontinuous samples;

Processor extracts the dependent indexing information corresponding to the MFUs of first media data, wherein the dependent indexing information is the information except the displaying time information of MFUs' sample;

Transmitter transmits the extracted MFUs of the first media data;

Processor uses the dependent indexing information corresponding to the MFUs of the first media data, and locate the second media data's access unit, wherein the second media data's access unit is referenced by encoding or decoding operation of the first media data sample belonging to the MFUs. Wherein the second media data meets one of the following requirements:

If the second media data is timed media data, the two or more temporally discontinuous samples of the first media data refer to the same second media data's access unit, wherein the time period of the second media data's access unit is not aligned with the time period of at least one sample of two or more temporally discontinuous samples of the first media data; or If the second media data is non-timed media data, the two samples of the first media data refer to the same second media data's access unit;

Processor searches the second media data's access unit in hypothetical buffer;

When the hypothetical buffer does not possess the second media data's access unit, processor fragments the second media data's access unit into media fragment units;

Transmitter transmits the media fragment units of the second media data's access data.

Another exemplary embodiment provides an apparatus of transmitting media data comprises:

The first fragment unit: used to fragment the first media data into media fragment units (MFUs), where the first media data is timed media data and consists of two or more temporally discontinuous samples;

The first extraction unit: used to extract the dependent indexing information corresponding to the MFUs of first media data, where the dependent indexing information is the information except the displaying time information of MFUs' sample;

The first transmission unit: used to transmit the extracted MFUs of the first media data The location unit: uses the dependent indexing information corresponding to the MFUs of the first media data, and locate the second media data's access unit, where the second media data's access unit is referenced by encoding or decoding operation of the first media data sample belonging to the MFUs. The second media data meets one of the following requirements:

If the second media data is timed media data, the two or more temporally discontinuous samples of the first media data refer to the same second media data's access unit, and the time period of the second media data's access unit is not aligned with the time period of at least one sample of two or more temporally discontinuous samples of the first media data; or If the second media data is non-timed media data, the two samples of the first media data refer to the same second media data's access unit;

The searching unit: used to search the second media data's access unit in the hypothetical buffer;

The second fragment unit: when the second media data's access unit does not exist in the hypothetical buffer, it is used to fragment the second media data's access unit into media fragment units;

The second transmission unit: used to transmit the media fragment units of the second media data's access unit.

Another exemplary embodiment provides an apparatus of transmitting media data comprises:

The first inclusion unit: contains two or more assets, and a composition information (CI). The asset contains MPU. Each MPU contains one type of data of media data. CI records dependency information between assets.

The first fragment unit: used to fragment the first media data into media fragment units (MFUs), where the first media data is timed media data and consists of two or more temporally discontinuous samples;

The extraction unit: used to extract the dependent indexing information corresponding to the MFUs of first media data, where the dependent indexing information is the information except the displaying time information of MFUs' sample;

The first transmission unit: used to transmit the extracted MFUs of the first media data The location unit: uses the dependent indexing information corresponding to the MFUs of the first media data, and locate the second media data's access unit, where the second media data's access unit is referenced by encoding or decoding operation of the first media data sample belonging to the MFUs. The second media data meets one of the following requirements:

If the second media data is timed media data, the two or more temporally discontinuous samples of the first media data refer to the same second media data's access unit, and the time period of the second media data's access unit is not aligned with the time period of at least one sample of two or more temporally discontinuous samples of the first media data; or If the second media data is non-timed media data, the two samples of the first media data refer to the same second media data's access unit;

Another exemplary embodiment provides an apparatus of transmitting media data comprises:

The first package unit: contains two or more assets, and a composition information (CI). The asset contains MPU. Each MPU contains one type of data of media data. CI records dependency information between assets.

The first fragment unit: used to fragment the first media data into media fragment units (MFUs), where the first media data is timed media data and consists of two or more temporally discontinuous samples;

The extraction unit: used to extract the dependent indexing information corresponding to the MFUs of first media data, where the dependent indexing information is the information except the displaying time information of MFUs' sample;

The first transmission unit: used to transmit the extracted MFUs of the first media data;

The first location unit: used to determine the asset ID belonging to the referenced MFU.

The second location unit: uses the dependent indexing information corresponding to the MFUs of the first media data, and locate the second media data's access unit, where the second media data's access unit is referenced by encoding or decoding operation of the first media data sample belonging to the MFUs. The second media data meets one of the following requirements:

If the second media data is timed media data, the two or more temporally discontinuous samples of the first media data refer to the same second media data's access unit, and the time period of the second media data's access unit is not aligned with the time period of at least one sample of two or more temporally discontinuous samples of the first media data; or If the second media data is non-timed media data, the two samples of the first media data refer to the same second media data's access unit;

Another exemplary embodiment provides an apparatus of transmitting media data comprises:

The first package unit: contains two or more assets, and a composition information (CI). The asset contains MPU. Each MPU contains one type of data of media data. CI records dependency information between assets.

The first fragment unit: used to fragment the first media data into media fragment units (MFUs), where the first media data is timed media data and consists of two or more temporally discontinuous samples;

The extraction unit: used to extract the dependent indexing information corresponding to the MFUs of first media data, where the dependent indexing information is the information except the displaying time information of MFUs' sample;

The first transmission unit: used to transmit the extracted MFUs of the first media data;

The synchronization unit: used to describe dependency relation between MFUs, where timed metadata has the same non-aligned time period of the first media data. Synchronization between timed metadata and video layer's data is kept by aligning time period. Meanwhile, timed metadata also describes the second media data that is used for synchronization, where the first media data is correlated with the second metadata indirectly.

The invention claimed is:

1. A method to produce media data, comprising:

putting a sample entry of a first media data in a first media track, wherein the first media data is timed media data, and the sample entry contains metadata pointing to the sample of the first media data;

putting an access unit entry of a second media data in a second media box, wherein the access unit entry contains metadata pointing to the access unit of the second media data, and the second media data is timed or non-timed media data;

setting dependency information between the samples of the first media data and the access units of the second media data to indicate that the encoding or decoding of two or more temporally-discontinuous samples of the first media data reference to the same one access unit of the second media data, wherein the said samples belong to at least two different random access segments, wherein the operation of setting dependency information between sample of the first media data and access unit of the second media data to indicate that the encoding or decoding of two or more temporally-discontinuous samples of the first media data reference to the same one access unit of the second media data further comprising:

marking the said two or more temporally-discontinuous samples in the first media data as a sample group, wherein the said one access unit and at least one of the said samples are not temporally aligned if the second media data is timed media data, and if the second media data is timed media data, putting track reference information pointing to the second media data box in the first media track, wherein the track reference information contains an identifier indicating that the same group of access units and at least one of the said samples are not temporally aligned.

2. The method according to claim 1, further comprising:

putting description information of the sample group in the first media track, wherein the description information of the sample group contains an identifier indicating that the encoding or decoding of the said samples reference to the same one access unit.

3. The method according to claim 1, wherein the operation of setting dependency information between sample of the first media data and access unit of the second media data to indicate that the encoding or decoding of two or more temporally-discontinuous samples of the first media data reference to the same one access unit of the second media data further comprising:

putting dependency metadata for each sample respectively, wherein the sample is one of the two or more temporally-discontinuous samples in the first media data, and wherein the dependency metadata corresponding to each sample contains index information that points to the same one access unit in the second media data, and wherein the index information is any information other than the presentation time information of the sample of the first media data, and wherein the same one access unit and at least one of the said two or more temporally-discontinuous samples are not temporally aligned if the second media data is timed media data.

4. The method according to claim 3, wherein putting dependency metadata for each sample respectively also comprises:
putting the dependency metadata in a timed metadata;
putting sample entry of the timed metadata in a timed metadata track.

5. The method according to claim 3, wherein putting dependency metadata for each sample respectively, wherein the sample is one of two or more temporally-discontinuous samples in the first media data also comprises:
putting the dependency metadata in segment index data box.

6. A method of processing media data, comprising:
extracting a first media data and a second media data, wherein the first media data is timed media data, and the second media data is timed media data or non-timed media data;
extracting dependency information between the samples of the first media data and the access units of the second media data to obtain the information that the encoding or decoding of two or more temporally-discontinuous samples of the first media data reference to the same one access unit of the second media data, wherein the said samples belong to at least two different random access segments,
wherein the operation of extracting dependency information between the samples of the first media data and the access units of the second media data to obtain the information that the encoding or decoding of two or more temporally-discontinuous samples of the first media data reference to the same one access unit of the second media data further comprising:
marking the said two or more temporally-discontinuous samples in the first media data as a sample group, wherein the said one access unit and at least one of the said samples are not temporally aligned if the second media data is timed media data, and
if the second media data is timed media data, putting track reference information pointing to the second media data box in the first media track, wherein the track reference information contains an identifier indicating that the same group of access units and at least one of the said samples are not temporally aligned.

7. The method according to claim 6, wherein the operation of extracting dependency information between the sample of the first media data and the access unit of the second media data to obtain the information that the encoding or decoding of two or more temporally-discontinuous samples of the first media data reference to the same one access unit of the second media data further comprising:
extracting sample group from the track carrying the first media data, wherein the sample group contains two or more temporally-discontinuous samples;
according to the description information in the sample group, locating one access unit in the second media data for each sample of the two or more temporally-discontinuous samples, wherein the index information of the one access unit is carried in the description information of the sample group, and wherein
the one access unit is not aligned with the duration covered by at least one of the said samples of the first media data if the second media data is timed media data.

8. The method according to claim 7, further comprising:
if the second media data is timed media data, parsing the track reference information identifier, pointing to the box to which the second media data belongs, from the track containing the first media data, in order to obtain the information that the same one access unit and at least one of the said samples are not temporally aligned.

9. The method according to claim 7, further comprising:
from the description information in the sample group from the first media track, parsing the identifier to obtain the information of the same one access unit to which the said two or more temporally-discontinuous samples reference while in encoding or decoding.

10. The method according to claim 6, wherein the operation of extracting dependency information between the sample of the first media data and the access unit of the second media data to obtain the information that the encoding or decoding of two or more temporally-discontinuous samples of the first media data reference to the same one of access unit of the second media data further comprising:
extracting two or more temporally-discontinuous samples from the first media data;
extracting the dependency metadata from each sample of the two or more temporally-discontinuous samples;
according to the dependency metadata, locating one access unit in the second media data for each sample of the two or more temporally-discontinuous samples, wherein the index information of the one access unit is carried by the dependency metadata, and wherein the same one access unit and at least one of the two or more temporally-discontinuous samples in the first media data are not temporally aligned if the second media data is timed media data.

11. The method according to claim 10, wherein extracting dependency metadata from each sample of the two or more temporally-discontinuous samples further comprising:
extracting the timed metadata pointed to by the sample entry in a timed metadata track;
extracting dependency metadata in the timed metadata.

12. The method according to claim 10, wherein extracting dependency metadata from each sample of two or more of temporally-discontinuous samples further comprising:
extracting the dependency metadata from segment index data box.

13. An apparatus to produce media data comprising:
a processor;
a memory; and
one or more programs are used to complete the following methods:
the processor puts sample entry of a first media data in a first media track, wherein the first media data is timed media data, and a sample entry contains metadata pointing to sample of the first media data;
the processor puts access unit entry of second media data in a second media box, wherein the access unit entry contains metadata pointing to access unit of the second media data, and the second media data is timed or non-timed media data;
the processor sets dependency information between sample of the first media data and access unit of the second media data to indicate that the encoding or decoding of two or more temporally-discontinuous samples of the first media data reference to the same one of access unit of the second media data, wherein the said samples belong to at least two different random access segments;
the media data produced by the processor is stored in the memory,
wherein the processor sets dependency information between sample of the first media data and access unit of the second media data to indicate that the encoding or decoding of two or more temporally-discontinuous samples of the first media data reference to the same one access unit of the second media data by:

marking the said two or more temporally-discontinuous samples in the first media data as a sample group, wherein the said one access unit and at least one of the said samples are not temporally aligned if the second media data is timed media data, and if the second media data is timed media data, putting track reference information pointing to the second media data box in the first media track, wherein the track reference information contains an identifier indicating that the same group of access units and at least one of the said samples are not temporally aligned.

14. An apparatus of processing media data comprising:
a processor;
a memory; and
one or more programs are used to complete the following methods:

the processor extracts a first media data and a second media data, wherein the first media data is timed media data, and the second media data is timed media data or non-timed media data;

the processor extracts dependency information between the sample of the first media data and the access unit of the second media data to obtain the information that the encoding or decoding of two or more temporally-discontinuous samples of the first media data reference to the same one access unit of the second media data, wherein the said samples belong to at least two different random access segments;

the media data processed by the processor is stored in the memory, wherein the processor extracts dependency information between the sample of the first media data and the access unit of the second media data to obtain the information that the encoding or decoding of two or more temporally-discontinuous samples of the first media data reference to the same one access unit of the second media data, wherein the said samples belong to at least two different random access segments by:

marking the said two or more temporally-discontinuous samples in the first media data as a sample group, wherein the said one access unit and at least one of the said samples are not temporally aligned if the second media data is timed media data, and if the second media data is timed media data, putting track reference information pointing to the second media data box in the first media track, wherein the track reference information contains an identifier indicating that the same group of access units and at least one of the said samples are not temporally aligned.

15. The apparatus according to claim 14, wherein the operation of extracting dependency information between the sample of the first media data and the access unit of the second media data to obtain the information that the encoding or decoding of two or more temporally-discontinuous samples of the first media data reference to the same one access unit of the second media data, wherein the processor extracts sample group from the track carrying the first media data, wherein the sample group contains two or more temporally-discontinuous samples;

according to the description information in the sample group, the processor locates one access unit in the second media data for each sample of the two or more temporally-discontinuous samples, wherein the index information of the one access unit is carried in the description information of the sample group, and wherein the same one access unit is not aligned with the duration covered by at least one of the said samples of the first media data if the second media data is timed media data.

16. The apparatus according to claim 14, wherein the operation of extracting dependency information between the sample of the first media data and the access unit of the second media data to obtain the information that the encoding or decoding of two or more temporally-discontinuous samples of the first media data reference to the same one access unit of the second media data, wherein the processer extracts two or more temporally-discontinuous samples from the first media data;

the processer extracts the dependency metadata from each sample of the two or more temporally-discontinuous samples;

according to the dependency metadata, the processor locates one access unit in the second media data for each sample of the two or more temporally-discontinuous samples, wherein the index information of the one access unit is carried by the dependency metadata, and wherein the same one access unit and at least one of the two or more temporally-discontinuous samples in the first media data are not temporally aligned if the second media data is timed media data.

* * * * *